(12) United States Patent
Jessop et al.

(10) Patent No.: US 11,007,043 B2
(45) Date of Patent: *May 18, 2021

(54) DENTAL CURING LIGHT HAVING UNIBODY DESIGN THAT ACTS AS A HEAT SINK

(71) Applicant: Ultradent Products, Inc., South Jordan, UT (US)

(72) Inventors: Dee Jessop, Salt Lake City, UT (US); Jared Sheetz, Eagle Mountain, UT (US); Neil T. Jessop, Sandy, UT (US)

(73) Assignee: Ultradent Products, Inc., South Jordan, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/252,456

(22) Filed: Jan. 18, 2019

(65) Prior Publication Data

US 2019/0167401 A1 Jun. 6, 2019

Related U.S. Application Data

(63) Continuation of application No. 16/119,815, filed on Aug. 31, 2018, which is a continuation of application
(Continued)

(51) Int. Cl.
*A61C 13/15* (2006.01)

(52) U.S. Cl.
CPC .......... *A61C 19/003* (2013.01); *A61C 19/004* (2013.01)

(58) Field of Classification Search
CPC .............................. A61C 19/003; A61C 19/004
See application file for complete search history.

(56) References Cited

U.S. PATENT DOCUMENTS 5,039,304 A    8/1991  Heil
5,420,768 A *  5/1995  Kennedy .............. A61C 19/004
                                                              362/109
(Continued)

FOREIGN PATENT DOCUMENTS

CN    1276917    12/2000
CN    1461205    12/2003
(Continued)

OTHER PUBLICATIONS

Japanese Office Action cited in Japanese Application No. 20150227914 dated Aug. 1, 2017.
(Continued)

*Primary Examiner* — Edward Moran
(74) *Attorney, Agent, or Firm* — Maschoff Brennan

(57) ABSTRACT

A dental curing light includes a device body that efficiently conducts heat away from the light emitting diode portion of the curing light. The device body includes a proximal gripping end and a distal head end. The device body is formed from a thermally conductive body material. Excellent heat conduction away from the LED dies is achieved using a thermally conductive layer disposed over the device body. The thermally conductive layer serves as a conduit to quickly conduct heat away from the LED dies for dissipation within the material of the device body. In this manner, the material of the device body serves as a highly efficient heat dissipater. The surface area coupling the thermally conductive layer to the device body is sufficiently large that a majority (e g, substantially all) of heat being conducted by the thermally conductive layer is transferred to the device body during operation of the device.

21 Claims, 15 Drawing Sheets

Related U.S. Application Data

No. 13/133,129, filed as application No. PCT/US2009/069738 on Dec. 29, 2009.

(60) Provisional application No. 61/174,843, filed on May 1, 2009, provisional application No. 61/174,873, filed on May 1, 2009, provisional application No. 61/141,482, filed on Dec. 30, 2008.

(56) References Cited

U.S. PATENT DOCUMENTS

| | | | |
|---|---|---|---|
| 6,149,430 | A | 11/2000 | Nemetz et al. |
| 6,331,111 | B1 | 12/2001 | Cao |
| 6,419,483 | B1 | 7/2002 | Adam et al. |
| 6,481,874 | B2 | 11/2002 | Petroski |
| 6,485,301 | B1 | 11/2002 | Gemunder et al. |
| 6,709,128 | B2 * | 3/2004 | Gordon ............... A61C 19/004 250/504 H |
| 6,722,883 | B2 | 4/2004 | Gorokhovsky |
| 6,739,744 | B2 | 5/2004 | Williams et al. |
| 6,790,421 | B2 | 9/2004 | Gier et al. |
| 6,921,181 | B2 | 7/2005 | Yen |
| 6,974,319 | B2 | 12/2005 | Cao |
| 6,991,356 | B2 | 1/2006 | Tsimerman et al. |
| 7,056,116 | B2 | 6/2006 | Scott et al. |
| 7,106,523 | B2 | 9/2006 | McLean et al. |
| 7,108,504 | B2 | 9/2006 | Cao |
| 7,144,250 | B2 | 12/2006 | Fischer et al. |
| 7,195,482 | B2 | 3/2007 | Scott |
| 7,250,611 | B2 | 7/2007 | Aguirre et al. |
| 7,273,369 | B2 | 9/2007 | Rosenblood et al. |
| 7,279,718 | B2 | 10/2007 | Krames et al. |
| 7,279,723 | B2 | 10/2007 | Matsumura et al. |
| 7,294,862 | B2 | 11/2007 | Wierer et al. |
| 2002/0051367 | A1 | 5/2002 | Hooker et al. |
| 2002/0074153 | A1 | 6/2002 | Uttinger et al. |
| 2002/0154305 | A1 | 10/2002 | Jung et al. |
| 2003/0036031 | A1 * | 2/2003 | Lieb ................ A61C 19/004 433/29 |
| 2003/0152885 | A1 | 8/2003 | Dinh |
| 2003/0219693 | A1 | 11/2003 | Cao |
| 2004/0126730 | A1 | 1/2004 | Panagotacos |
| 2004/0029069 | A1 | 2/2004 | Gill et al. |
| 2004/0091750 | A1 | 5/2004 | Oliver et al. |
| 2004/0248059 | A1 | 9/2004 | Katsuda et al. |
| 2004/0218039 | A1 | 11/2004 | Cooper |
| 2005/0136372 | A1 | 6/2005 | Fischer et al. |
| 2005/0142514 | A1 | 6/2005 | Scott |
| 2005/0196721 | A1 * | 9/2005 | Jackson, III ......... A61C 19/004 433/29 |
| 2005/0207148 | A1 | 9/2005 | Maglica |
| 2005/0276053 | A1 * | 12/2005 | Nortrup ............... F21V 19/001 362/294 |
| 2006/0088797 | A1 * | 4/2006 | Scott ................. A61C 19/003 433/29 |
| 2006/0091415 | A1 | 5/2006 | Yan |
| 2006/0188836 | A1 | 8/2006 | Logan et al. |
| 2006/0275733 | A1 | 12/2006 | Cao |
| 2007/0027443 | A1 | 2/2007 | Rose et al. |
| 2007/0037113 | A1 | 2/2007 | Scott et al. |
| 2007/0122096 | A1 | 5/2007 | Temelkuran et al. |
| 2007/0134616 | A1 | 6/2007 | Gill et al. |
| 2007/0154823 | A1 | 7/2007 | Marson et al. |
| 2007/0190479 | A1 | 8/2007 | Jackson et al. |
| 2007/0241357 | A1 | 10/2007 | Yan |
| 2007/0256821 | A1 | 11/2007 | Mashiko et al. |
| 2007/0267646 | A1 | 11/2007 | Wierer et al. |
| 2007/0275344 | A1 | 11/2007 | Liu |
| 2008/0004612 | A1 | 1/2008 | Schmid et al. |
| 2008/0057463 | A1 | 3/2008 | Wong et al. |
| 2008/0070188 | A1 | 3/2008 | Lee |
| 2008/0268401 | A1 | 10/2008 | Kim |
| 2011/0143303 | A1 | 6/2011 | Kilcher et al. |

FOREIGN PATENT DOCUMENTS

| | | |
|---|---|---|
| CN | 101014295 | 8/2007 |
| EP | 0619100 | 10/1994 |
| EP | 0678282 | 10/1995 |
| EP | 1138276 | 3/2000 |
| GB | 2417876 | 3/2006 |
| JP | 2000232284 | 8/2000 |
| JP | 20040329501 | 11/2004 |
| WO | 9922667 | 5/1999 |
| WO | 2001064129 | 9/2001 |
| WO | 2004011848 | 7/2003 |
| WO | 2005081947 | 9/2005 |
| WO | 2006107122 | 10/2006 |

OTHER PUBLICATIONS

Sherman, Lilli Manolis; "Plastics that Conduct Heat"; Jun. 2001, Plastics Technology.

Barton et al.: "Photonic Crystals Improve LED Efficiency"; Apr. 17, 2006; SPIE Newsroom; 2 pages.

U.S. Appl. No. 16/119,815, Title: Dental Curing Light Having Unibody Design That Acts as a Heat Sink, filed. Aug. 31, 2019, Inventor: Dee Jessop.

Office Action dated Jul. 2, 2019, U.S. Appl. No. 16/119,815, Title: Dental Curing Light Having Unibody Design That Acts as a Heat Sink, filed Aug. 31, 2019, Inventor: Dee Jessop.

* cited by examiner

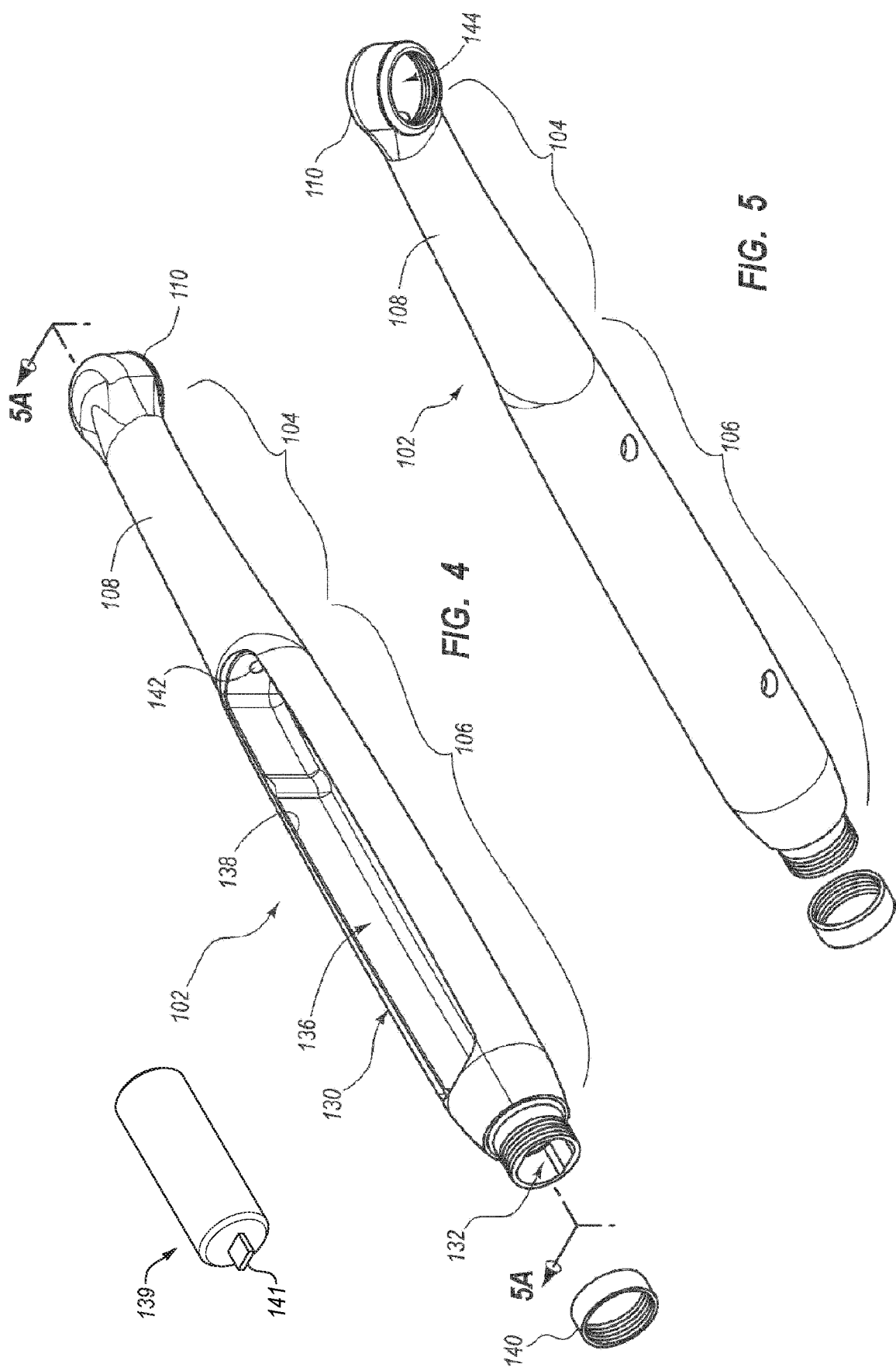

DENTAL CURING LIGHT HAVING UNIBODY DESIGN THAT ACTS AS A HEAT SINK

CROSS REFERENCE TO RELATED APPLICATIONS

This application claims the benefit of and priority to U.S. application Ser. No. 16/119,815 which claims the benefit of and priority to U.S. application Ser. No. 13/133,129, which is a nationalization of PCT application No.: US2009/069738 which claims priority to U.S. provisional application Nos. 61/174,843; 61/141,482; and 61/174,873. These applications are incorporated herein by reference in their entireties.

BACKGROUND

The Field of the Invention

The present invention generally relates to the field of light curing devices. More particularly, the invention relates to light curing devices including one or more light emitting diodes (e.g., LEDs) for providing light curing wavelengths configured to cure polymerizable compositions.

The Relevant Technology

In the field of dentistry, dental cavities or preparations are often filled and/or sealed with photosensitive polymerizable compositions that are cured by exposure to radiant energy, such as visible light. These compositions, commonly referred to as light-curable compositions, are placed within dental cavity preparations or onto dental surfaces where they are subsequently irradiated by light. The radiated light causes photosensitive components within the compositions to initiate polymerization of polymerizable components, thereby hardening the light-curable composition within the dental cavity preparation or other dental surface.

Light-curing devices are typically configured with an activating light source, such as a quartz-tungsten-halogen (QTH) bulb or light emitting diodes (LEDs). QTH bulbs generate a broad spectrum of light that can be used to cure a broad range of polymerizable compositions. QTH bulbs generate substantial waste heat and require bulky surrounding structure to draw waste heat away from the bulb and to dissipate the waste heat.

Use of LED light sources has been a significant improvement in dental curing devices. LEDs are smaller than QTH bulbs and generally radiate light at a narrow range surrounding a specific peak wavelength. They often require significantly less input power to generate a desired output of radiation. In addition, LED light sources provide a longer life (e.g., tens of thousands of hours or more) than QTH bulbs. However, thermal management (e.g., dissipating heat) is still an issue with devices which include LED light sources.

While prior LED curing light devices may produce less waste heat than bulb curing devices, LED curing devices still tend to produce waste heat that significantly raises the temperature of the LED and immediately surrounding structures during illumination. This increase in temperature may reduce the useful life of the LED. LEDs can burn out due to overheating within a matter of minutes, requiring replacement of the LED light source if the heat is not dissipated.

SUMMARY

The present invention is directed to curing light devices that efficiently dissipate heat away from a light emitting diode (LED) during use. The dental curing light devices include a device body having a proximal gripping end (i.e., handle portion) connected to a distal head portion by a neck portion. The device body is advantageously formed from one or more thermally conductive body materials (e.g., thermally conductive metal, polymer, ceramic, and/or thermally conductive ceramic fibers or nanomaterials). In one embodiment, the device body is one continuous piece with no joints (i.e., a "unibody" construction). All or a portion of the device body can be made from the thermally conductive body material so long as the device body has sufficient thermal conductivity to dissipate the desired heat generated by the LED during use (i.e., with the device set to a maximum user selectable light output). In one embodiment, an LED assembly is included on or within the distal head portion of the device body. The LED assembly includes one or more LED dies and a thermally conductive LED assembly substrate, and the one or more LED dies are electrically coupled to one or more contacts on the LED assembly. The one or more LED dies are configured to emit a spectrum of light capable of curing a light curable composition. The emitted spectrum may include one peak wavelength in an embodiment where all LEDs are configured to emit at the same wavelength. Alternatively, the spectrum may include two or more different peak wavelengths where at least one of the LED dies is configured to emit a different peak wavelength relative to at least one other LED die.

Heat dissipation from the LED assembly may be achieved using a thermally conductive layer on the distal head portion of the device body between the LED assembly and the thermally conductive body material of the device body. The thermally conductive layer is thin and therefore lacks sufficient mass to serve as a heat sink; however, the thermally conductive layer has a sufficiently high surface area and thermal conductivity to serve as a conduit to dissipate heat from the LED assembly substrate into the body material of the device body. The material of the device body serves as a highly efficient heat dissipater, thereby obviating the need for a separate internal heat sink. In one embodiment, advantageously, the dental curing device does not include an internal heat sink. The surface area coupling the thermally conductive layer to the device body is sufficiently large that a majority (e.g., substantially all) of the heat conducted away from the LED assembly by the thermally conductive layer is transferred to the device body.

In one embodiment, the thermally conductive layer may comprise a separate piece that is secured to a portion of the device body and may have a thickness in a range from about 100 microns to about 1.5 mm and can be made from one or more highly thermally conductive materials, such as, but not limited to, beryllium oxide, diamond, aluminum nitride, or combinations of these. In another embodiment, the thermally conductive layer may comprise a very thin layer applied over at least a portion of the device body (e.g., by chemical or plasma vapor deposition or plasma flame spraying). In such embodiments, the thickness may be only about 0.05 micron to about 50 microns. The thickness and surface area of the thermally conductive layer is sufficient to ensure that most, if not essentially all, of the waste heat generated by the LED is transferred through the thermally conductive layer and dissipated into the body material. At moderate to low operating temperatures, the thermally conductive layer can dissipate heat from the substrate of the LED assembly at the same rate that heat is dissipated into the LED assembly substrate from the LED assembly, thereby allowing continuous moderate to low temperature operation. The use of a thermally conductive layer in contact with sufficient surface area of the device body has been found to provide surprisingly good heat dissipation from the one or more LEDs. The present inventive configurations essentially eliminate the long existing problems associated with over heating in LED-based curing lights.

According to an alternative embodiment, individual LED semiconductor dies may be directly mounted to the device body. In other words, the device body becomes the substrate on which the LED semiconductor dies are directly mounted. Power connections to the individual dies may be made by electrically conductive metal traces (e.g., gold) disposed on or through the thermally conductive, electrically insulative layer formed over the device body. This is different from the above described embodiment in which a relatively larger LED assembly including its own LED assembly substrate is mounted on the distal head portion of the device body. In the alternative embodiment, the thin thermally conductive, electrically insulative layer disposed over at least the distal head portion of the device body is significantly thinner (e.g., about 0.05 to about 50 microns) as compared to the thickness of an LED assembly substrate (e.g., on the order of about 500-1000 microns). Such LED substrates must be sufficiently thick so as to provide a degree of protection and strength to the overall LED package including one or more LED dies mounted on the substrate. The thermally conductive/electrically insulative layer is sufficiently thick so as to electrically insulate the dies from the underlying body, which may comprise metal. At the same time, the layer is relatively thin (e.g., no more than about 50 microns, preferably no more than about 10 microns) so as to minimize resistance to thermal conduction through this layer. Such an embodiment may exhibit even further improved heat dissipation as the relatively thick substrate layer of the LED package assembly is eliminated.

In one embodiment, the curing light device includes an electronics assembly that controls power to the one or more LED dies. The electronics assembly can be configured to drive the one or more LED dies at very high light intensities for extended periods of time without overheating the LED die due to the ability to efficiently dissipate heat away from the LED. In one embodiment, the one or more LED dies can produce a stable emission of light of at least about 2000 mW/cm$^2$, at least 3000 mW/cm$^2$, or even greater than 3500 mW/cm$^2$. The LED curing devices of the present invention can achieve stable light output with one or more LEDs that is as intense as, or even more intense than, light generated by an arc lamp, which typically operates at 3500 mW/cm$^2$. Curing lights of the present invention dissipate heat through the body, allowing the device to be operated at high power and longer time periods compared to conventional light curing devices.

In one embodiment of the invention, the electronics assembly is configured to minimize wavelength shifting of the output of the one or more LED dies, even at high intensity light output. In this embodiment, the electronics assembly is configured to power the LED dies at a maximum power input that is substantially below the actual maximum or rated power input of the LED die. For example, the curing light can include an LED assembly that is rated at 10 watts, and the electronics assembly can be configured to power the device at a maximum input power of 2.5 watts. In one embodiment, the electronics assembly is configured to power the one or more LED dies at a maximum power of less than about 80% of the rated maximum input of the one or more LED dies, more preferably less than about 50%, and most preferably less than about 40% of the rated maximum input of the one or more LED dies, while achieving a total light output of at least about 1000 mW/cm$^2$ from the light curing device, more preferably at least about 2000 mW/cm$^2$, even more preferably at least about 3000 mW/cm$^2$, or even at least about 3500 mW/cm$^2$ of total light output from the light curing device. In this way, the stability of the light output is maintained. For example, any wavelength shift is minimized so as to preferably be less than about 1%, more preferably less than about 0.5%, and most preferably less than about 0.1%.

In one embodiment, the underpowered device can achieve a very high efficiency of total light output per watt of input power. In one embodiment, the efficiency of the LED dies of the curing light can be at least about 40%, at least about 60%, or even at least about 80% efficient. The highest efficiencies of the dental curing light device may be achieved with configurations including a reflective collar between the LED and the lens and/or include an anti-reflective coating on the lens. Some embodiments may employ a light collimating photonic crystal instead of a lens.

The device body has substantial heat dissipating capacity due to its much larger size relative to the LED die(s) and/or LED assembly. Because the device body serves as a heat dissipater, no separate heat sink is required within the body of the device. Eliminating the heat sink (as compared to typical prior art devices) can simplify the manufacturing process and allow for smaller, thinner, neck and distal head configurations that are more maneuverable within the patient's mouth while providing excellent heat dissipation. Providing a device body with a unibody construction helps maximize heat dissipation. It also minimizes joints and seams where debris might collect.

In one embodiment, the head portion of the device body can have a removable cup-like member that houses the LED assembly and at least a portion of the thermally conductive layer. The thermally conductive layer is coupled to the LED assembly to facilitate heat transfer from the LED(s) of the assembly to the removable member and into the device body. The removable member can screw in or otherwise connect to a part of the distal head portion. When attached, the removable member becomes thermally integrated with the distal head portion, for example, by ensuring high surface area contact between a corresponding part of the distal head portion and the removable member such that efficient thermal conduction through the removable member and to the rest of the device body is maintained.

In one embodiment, the entirety of the device body including the handle portion, the neck portion, and the distal head portion, is formed of a single piece of thermally conductive material. Exemplary metals that may be used include, but are not limited to, aluminum, copper, magnesium and/or alloys thereof. Exemplary thermally conductive ceramic materials that may be used include, but are not limited to, fibers or nanomaterials of carbon (e.g., graphene), boron, boron nitride, and/or combinations thereof. Because the single piece body is only one piece, there are no seams or joints within the body itself, and other interfaces within the overall device are minimized. For example, the single piece body (i.e., unibody construction) may include an LED head assembly hole, a control assembly hole, and a power cord hole. The LED head assembly hole is configured to receive the removable member including the LED assembly. In an embodiment in which individual LED semiconductor dies (absent any supporting LED assembly substrate) are directly mounted onto the head of the device body, the LED head assembly hole may be omitted. Of course, in another embodiment individual LED semiconductor dies may be directly mounted onto the removable member, which is later coupled into the LED head assembly hole of the device. The control assembly hole formed within the handle portion of the body is configured to receive the electronics control assembly. The power cord hole formed at the proximal end of the body is configured to receive a power cord that is coupled to the electronics control assembly. Of course, the body may include other holes through the body to accommodate one or more screws or other attachment means to hold internal components in place.

Because the entirety of the body is formed as a single piece in the unibody construction, heat dissipation throughout the body is improved, as seams within the body itself (i.e., where a first piece of the body abuts a second piece of the body) can create resistance to thermal conduction. The body advantageously has no such abutment seams. The absence of such seams within the body also provides for a robust dental curing light that can better withstand rough handling and/or dropping.

These and other benefits, advantages and features of the present invention will become more full apparent from the following description and appended claims, or may be learned by the practice of the invention as set forth hereinafter.

BRIEF DESCRIPTION OF THE DRAWINGS

In order that the manner in which the above recited and other benefits, advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 4 is a top perspective view of the device body of the dental curing light of FIG. 1;

FIG. 5 is a bottom perspective view of the device body of the dental curing light of FIG. 1;

DETAILED DESCRIPTION

I. Introduction

The present invention is directed to a dental curing light that efficiently dissipates heat away from the light emitting diode (LED) portion of the curing light. The device body is formed from a thermally conductive body material, (e.g., thermally conductive metal, polymer, ceramic, and/or thermally conductive ceramic fibers or nanomaterials). Excellent heat dissipation away from the one or more LEDs is achieved using a thermally conductive layer coupled to the device body. The thermally conductive layer is disposed over at least part of the distal head portion of the device body so as to efficiently conduct heat away from the one or more LEDs and into the device body. The thermal conductivity of the layer is sufficiently high that the thermally conductive layer serves as a conduit to quickly conduct heat away from the substrate of the LED assembly or from direct mounted LED dies to the material of the device body, where the heat is dissipated. In this manner, the body material of the device body can serve as a highly efficient heat dissipater. The surface area of the thermally conductive layer thermally coupling the LED assembly or direct mounted LED dies to the device body is sufficiently large that a majority (e.g., substantially all) of waste heat conducted into the thermally conductive layer is quickly transferred to the device body for dissipation. In general, the surface area of the thermally conductive layer is advantageously larger than the surface area of the substrate of the LED assembly or direct mounted LED dies.

For purposes of this invention, the term "majority" means greater than 50%.

For purposes of the invention, the term "highest power setting of the light curing device" is the highest power setting that the device user can select, not the theoretical maximum power that could be input into the device's one or more LEDs.

Unless otherwise stated, "rated maximum power" shall refer to the greater of the maximum power rating provided by the LED manufacturer having tested and rated the LED or the maximum power input as defined by an industry standard for testing and rating maximum power of LEDs.

II. Exemplary Dental Curing Lights

Figure 1:
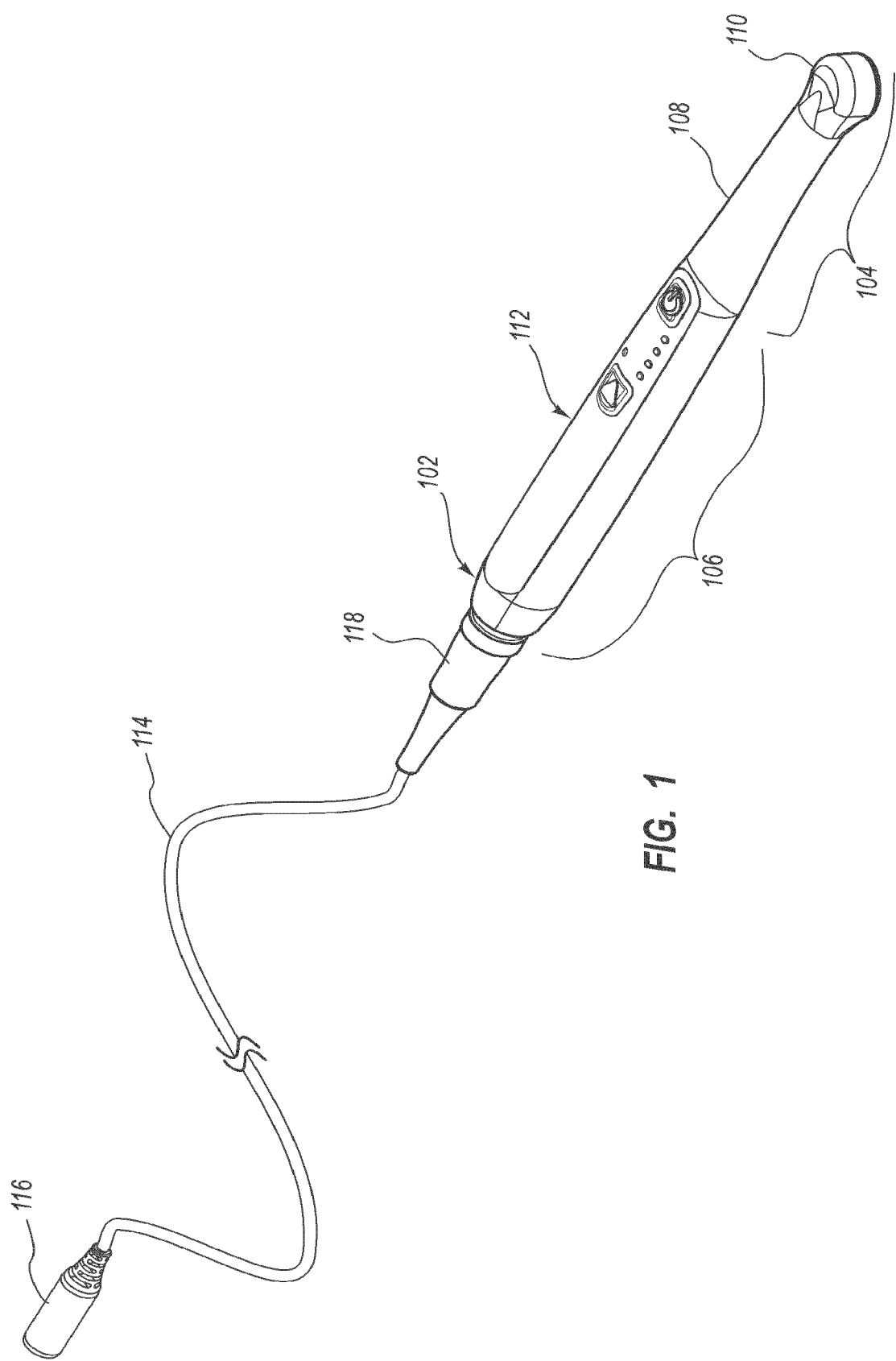
FIG. 1 is a top perspective view of a dental curing light including a device body having a proximal gripping end and a distal head end.
Figure 2:
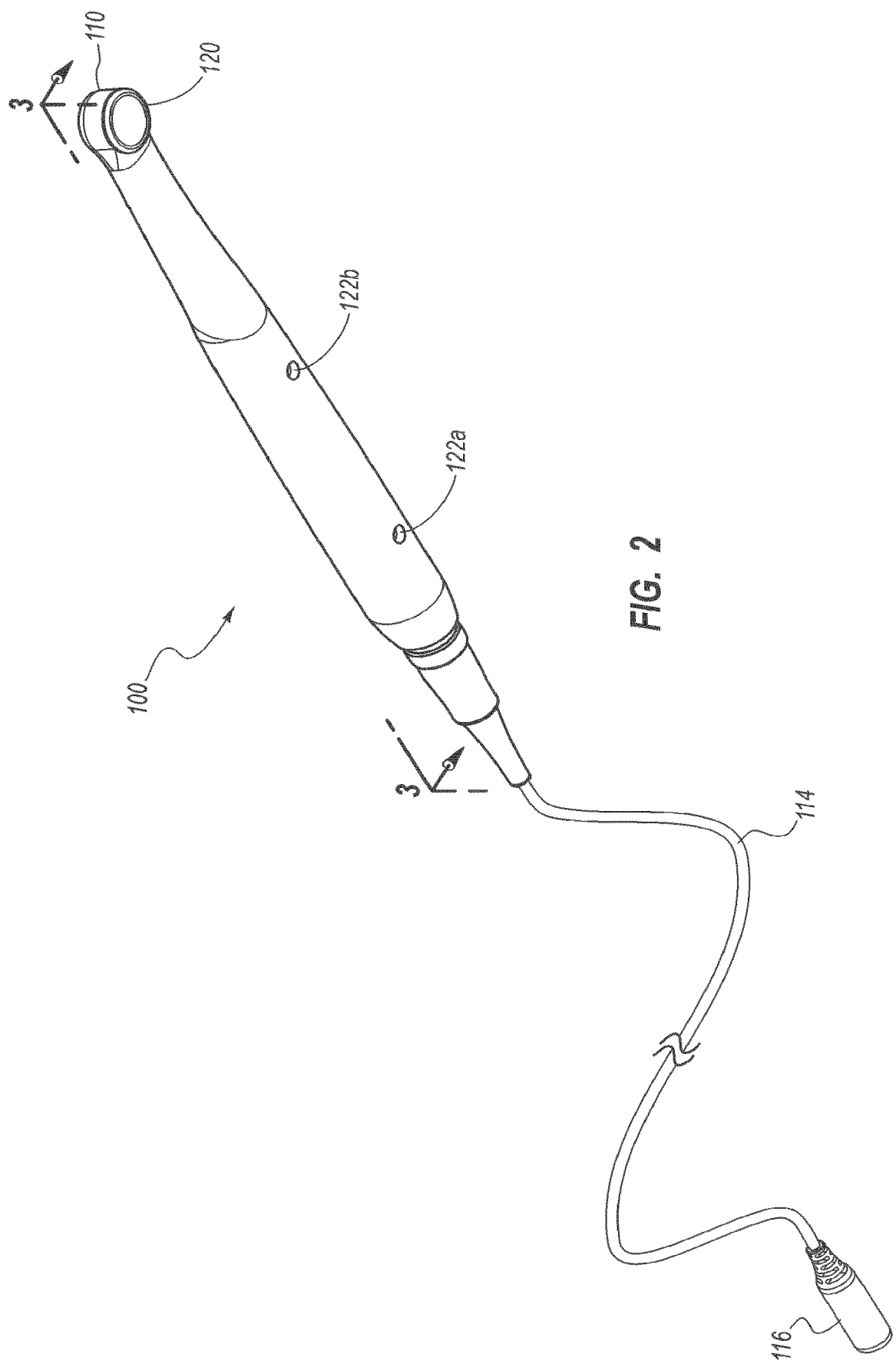
FIG. 2 is a bottom perspective view of the dental curing light of FIG. 1.
Figure 3:
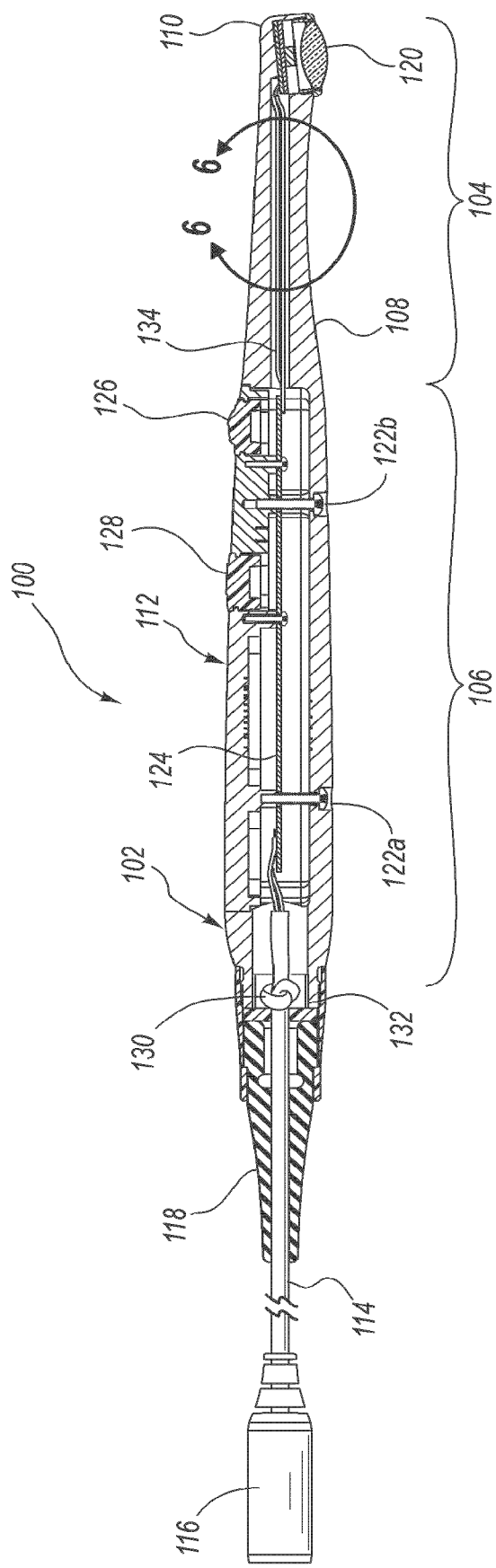
FIG. 3 is a cross-sectional view of the dental curing light of FIG. 1.

FIGS. 1-3 illustrate an exemplary dental curing light 100 including a device body 102 having a distal head end 104 and a proximal gripping end 106. Distal end 104 includes a neck portion 108 and a head portion 110. Distal end 104 is sized and configured to be inserted into the mouth of a The dental curing light 100 also includes an electronics assembly 112 positioned within a cavity of device body 102. The electronics assembly 112 allows the dental practitioner to power on and off the dental curing light 100 and control the intensity and duration of light output from the curing light 100. The electronics assembly can include hardware, circuitry and/or programming that allow the LED dies to be selectively powered and operated by a user. In one embodiment, the circuitry is programmable. Examples of programmable circuitry is described in Applicants U.S. Patent Application Ser. No. 61/174,562 entitled, "Dental Curing Light Including Active And Activatable Programs For Alternate Uses," which is hereby incorporated by reference.

Curing light 100 includes a power cord 114 having a plug 116 that allows the device to be coupled to a power source. However, in an alternative embodiment, the dental curing light can have a rechargeable battery 139, such as shown in FIG. 4, that powers the electronics assembly. Device body 102 may include a protective sleeve 118 attached to the proximal end. Protective sleeve 118 may enclose the opening in the device body 102 through which cord 114 passes and may also support cord 114 to prevent cord 114 from developing a short.

FIG. 2 shows a bottom perspective view of dental curing light 100. Head portion 110 includes an LED assembly 120. LED assembly 120 is configured to emit light at one or more wavelengths suitable for curing a dental curing composition in the mouth of a dental patient. Holes 122a and 122b allow the electronics assembly 112 to be secured to device body 102 using, for example, a pair of screws.

FIG. 3 shows a cross-sectional view of dental curing light 100. The electronics assembly 112 includes a circuit board 124, power button 126, and intensity selector 128. Power button 126 allows the dental practitioner to power the curing light 100 on and off. Intensity selector 128 allows the dental practitioner to increase the intensity of the light being emitted from LED assembly 120 from a minimum power output to a maximum power output. Actuating intensity selector 128 increases the power delivered to LED assembly 120 through circuit board 124. To decrease power intensity, the user can power the curing light 100 off and back on again. Alternative control and operation modes will be readily apparent to one of skill in the art. Wires 134 connect circuit board 124 with LED assembly 120. Power cord 114 is also connected to circuit board 124 to supply power to electronics assembly 112.

In one embodiment, power cord 114 may comprise a high strength fiber and/or composite material. For example, power cord 114 may comprise a material including Kevlar and/or carbon fiber. Such materials provide a highly flexible and supple power cord with exceptional strength characteristics. In a preferred embodiment, the power cord 114 is secured to device body 102 using a knot 130. Knot 130 in power cord 114 is positioned inside power cord hole 132 of device body 102. The knot 130 abuts the device body around hole 132 and prevents the cord 114 from pulling through the hole 132. Knot 130 has been found to be highly resistant to pulling through hole 132 and prevents breakage by distributing a pulling force across a larger surface area. Knot 130 can optionally be bonded or secured to device body 102 to prevent knot 130 from being pushed further into the cavity of the device body. Surprisingly, the combination of a high strength cord material such as Kevlar and/or carbon fiber and an internal knot have been found to withstand pull out forces of greater than about 50 pounds. Power cords using a knot may even be forcefully pulled upon (e.g., as might occur if a practitioner tripped over the cord) without causing damage to the connection between the power cord and the circuit board.

Circuit board 124 is electrically coupled to LED assembly 120. The electrical connection can be any connection suitable for use in a dental application, including, but not limited to, electrically conductive traces and/or wires. FIG. 3 illustrates wires 134 connecting circuit board 124 to LED assembly 120.

Device Body

Figure 5A:
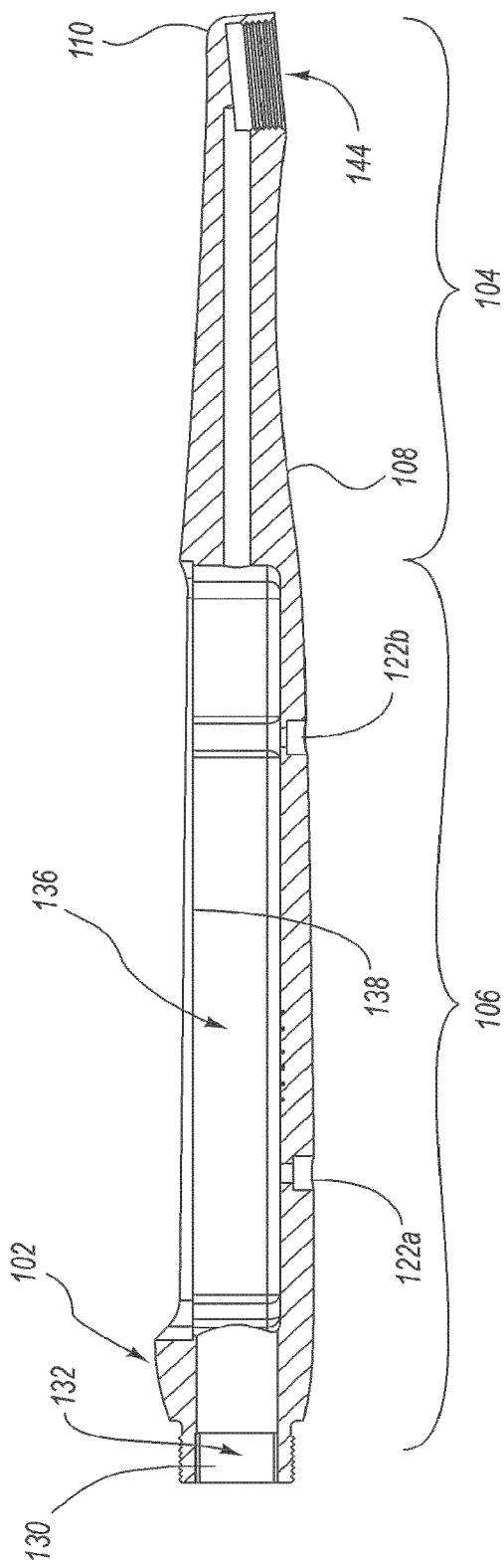
FIG. 5A is a cross-sectional view of the device body of FIG. 4.

FIGS. 4, 5 and 5A illustrate the device body 102 of dental curing light 100. Device body 102 includes a handle or gripping portion 106 that is sized and configured for a dental practitioner to hold and manipulate with the hand. Handle portion 106 is typically rounded and substantially wider than neck portion 108, which is configured for insertion into a mouth of a dental patient. Neck portion 108 is typically narrow and elongate for minimizing the space necessary to manipulate the curing light 100 in the patient's mouth. Head portion 110 may be wider than neck portion 108 to provide space for an LED assembly. Other configurations (e.g., including direct LED die mounting and/or small, flexible organic LED dies) may have a head portion that is as narrow as, or even more narrow than the neck portion. In one embodiment, the device body may be elongate. While the devices described herein typically include structural features which configure the device for use in the mouth of a patient, the device is not limited to use in the mouth. Head 110 is illustrated with a recess or cavity 144 housing the LED assembly. However, in an alternative embodiment, the head 110 can have a flat surface that supports the LED assembly (e.g., see FIGS. 5B-5C). As described more fully below, head 110 may also include a removable member that includes the LED assembly.

Device body 102 includes an internal cavity 136. Cavity 136 is sized and configured to house the electronics assembly used to operate the dental curing light 100, including powering LED assembly 120. Cavity 136 can include mounting points, grooves, and other features configured to securely receive an electronics assembly. In one embodiment, cavity 136 includes a rim 138 that is configured to form a tight fit with a corresponding rim of electronics assembly 112 (FIG. 3) to ensure proper sealing of cavity 136. As shown in the accompany figures, the internal cavity 136 may have substantially flat longitudinal sidewalls and the sidewalls may extend to a substantially flat bottom surface. The portions of the unitary, one-piece body 102 surrounding the longitudinal sidewalls and the bottom surface may have a convex shape. As shown in FIG. 3, for example, the internal cavity 136 may include one or more holes 122a, 122b that allow the electronics assembly 112 to be secured to the unitary, one-piece body 102.

Handle portion 106 also includes an end opening 132 that provides a passageway from cavity 136 to an exterior of device body 102. Opening 132 provides a passageway for power cord 114 as described above. A collar 140 provides a connection for sleeve 118 that protects cord 114 and seals opening 132, as described above with respect to FIG. 3.

Device body 102 may include a second passageway 142 that extends between cavity 136 and the recess or cavity 144 in head portion 110. Passageway 142 provides access between cavity 136 and 144 to deliver power to LED assembly 120.

Device body 102 is constructed from a thermally conductive body material. Device body 102 may be formed of any suitable thermally conductive body material, including, but not limited to, thermally conductive metals, polymers, ceramics, fibers and/or nanomaterials (e.g., nanotube and/or nanosheet materials such as graphene). In one embodiment, examples of suitable thermally conductive metals include, but are not limited to, aluminum, copper, magnesium and alloys thereof. In a preferred embodiment, the device body comprises an aluminum alloy. Aluminum alloys provide a device body that is sufficiently sturdy for use in the dental practice where instruments are often subjected to conditions or situations that might damage, blemish or otherwise cause deformations. Aluminum alloys typically include alloying metals that increase the toughness and other properties of the material. Examples of metals that can be alloyed with aluminum or other base metals include, but are not limited to, zinc, magnesium, copper, titanium, zirconium, and combinations of these. In one embodiment, the aluminum alloy is an alloy selected from the ANSI 6000 or 7000 aluminum alloy series. A discussion of ANSI 6000 and 7000 series aluminum and other suitable device body materials can be found in the "Handbook of Aluminum: Volume 2: Alloy Production and Materials Manufacturing", Jeorge E. Totten (editor), D. Scott MacKenzie, CRC; $1^{st}$ ed. (Apr. 25, 2003); "Introduction to Aluminum Alloys and Tempers", J. Gilbert Kaufman, ASM International, $1^{st}$ ed. (Dec. 15, 2000); and "Aluminum and Aluminum Alloys: ASM Specialty Handbook", Joseph R. Davis; ASM International (Dec. 1, 1993), all of which are hereby incorporated herein by reference.

In one embodiment, the aluminum alloy may be ANSI aluminum alloy 6061, 6033, 6013, 6020, 7075, 7068, and/or 7050 or any alloy having sufficient strength and thermal conductivity characteristics. In yet another embodiment, the device body may comprise a thermally conductive ceramic fiber (e.g., carbon fiber, boron fiber, boron nitride fiber, or other thermally conductive fiber). In yet another embodiment, the device body may comprise a thermally conductive nanomaterial (e.g., a graphene nano-sheet and/or nanotube).

Examples of thermally conductive polymers include hydrophobic and/or hydrophilic polymers that have a thermally conductive filler material included therein, such as, but not limited to, nanomaterials of carbon, beryllium oxide, boron nitride, and/or other thermally conductive ceramics and/or thermally conductive particulate metals. Examples of thermally conductive ceramics include aluminum nitride, beryllium oxide, silicon carbide, and boron nitride.

The device body can include any of the foregoing thermally conductive body materials alone or in combination. Although perhaps less preferred, the device body may include non-thermally conductive materials so long as substantial portions of the device body are thermally conductive so as to dissipate the desired amount of heat from the one or more LEDs when powered.

The device body can be a solid material in portions thereof and/or hollow in other portions. For example, the head and neck portions may be solid particularly in embodiments where the LED assembly is not removable and/or where the LED dies are directly mounted onto the thermally conductive layer. Hollow portions of the device body can provide locations for housing various components, such as, but not limited to, electrical components.

In one embodiment, the device body has a unibody construction. At least a portion of the handle 106, neck 108, and head 110 can be formed from a single piece of body material. In a preferred embodiment, substantially all of the handle portion, neck portion and head portion comprise a single piece of body material. The device body 102 serves as a heat dissipater for the one or more LEDs. Forming the body from a single piece of thermally conductive material maximizes heat conduction into the device body 102, where it can quickly be dissipated throughout the body and into the air.

Such a unitary body is shown in FIGS. 4, 5, and 5A. The entirety of device body 102, including handle portion 106, neck portion 108, and head portion 110, is formed of a single piece of thermally conductive material (e.g., preferably a metal such as an aluminum alloy). Because single piece body 102 is only one piece, there are no seams within the body 102 itself, and other interfaces are minimized. For example, the illustrated example includes an LED head assembly hole 144, a control assembly hole 136, and a power cord hole 132. The LED head assembly hole 144 is configured to receive an LED head assembly 120 (FIG. 3). The control assembly hole 136 formed within the handle portion 106 is configured to receive an electronics control assembly 112. Power cord hole 132 formed at the proximal end of body 102 is configured to receive a power cord 114 that is coupled to electronics control assembly 112 (FIG. 3).

The unibody construction shown in FIGS. 4, 5 and 5A eliminates seams and joints through the body 102 itself, and minimizes the presence of interfaces within the device 100 overall. Because the entirety of the body 102 is formed as a single piece, heat dissipation throughout the body 102 is improved, as seams or joints within a device body (i.e., where a first piece of the body abuts a second piece of the body) can create resistance to thermal conduction. The absence of such seams within the body 102 also provides for a robust dental curing light that can withstand rough handling and/or dropping. It also reduces joints or crevices where debris or bacteria might collect.

Although LED head assembly 120 comprises a separate piece in the illustrated embodiment (e.g., so as to provide advantages of quick replacement if an LED or other LED assembly component fails), there is only a single additional seam over which heat must be conducted, as heat is conducted from the LED head assembly 120 into unitary body 102. The presence of the single seam is a significant improvement over configurations in which the body comprises multiple pieces abutted and joined together. Such an embodiment easily allows removal and replacement of the LED head assembly (e.g., in the case of a failed LED or in order to upgrade the LED head assembly with a different one). In an alternative embodiment, even the LED head assembly may be integrated into the single piece body such that there is no seam over which heat must be conducted from the one or more LED dies into the remainder of the unitary body. Such a configuration is shown and described in conjunction with FIG. 5B.

Typically, the LED head assembly 120 comprises the same material as the body 102. In preferred embodiments, these structures are formed of metal (e.g., an aluminum alloy), and act as the only heat sink into which waste heat generated by the one or more LED dies is dissipated. Preferably, the LED head assembly 120 is relatively small in mass as compared to the mass of body 102 in embodiments in which they are separate pieces. For example, the LED head assembly 120 has a mass no more than about 25% of the mass of body 102, more preferably no more than about 10% of the mass of body 102, and most preferably no more than about 5% of the mass of body 102. As such, the mass and heat dissipating characteristics of the LED head assembly 120 are minor or insignificant as compared to body 102. LED head assembly 120 has a relatively small mass and simply acts to quickly facilitate conduction of heat across assembly 120 to body 102, where it can be dissipated. As a practical matter, body 102 acts as the only heat sink.

Device body 102 preferably comprises a metal such as aluminum, copper, magnesium, or alloys including such metals. Particularly preferred aluminum alloys include ANSI aluminum alloys 6061, 6033, 6013, 6020, 7075, 7068, and/or 7050. 7075 is an exemplary aluminum alloy that may be used in the manufacture of body 102. A single piece of aluminum alloy material may be machined, cast or molded, resulting in a unitary single piece body (i.e., unibody construction). Machining is preferred, as it provides a body with very narrow tolerance dimensions. Machined alloys often also exhibit greater density and strength as compared to metals or alloys formed by alternative methods (e.g., casting or metal injection molding).

Figure 5B:
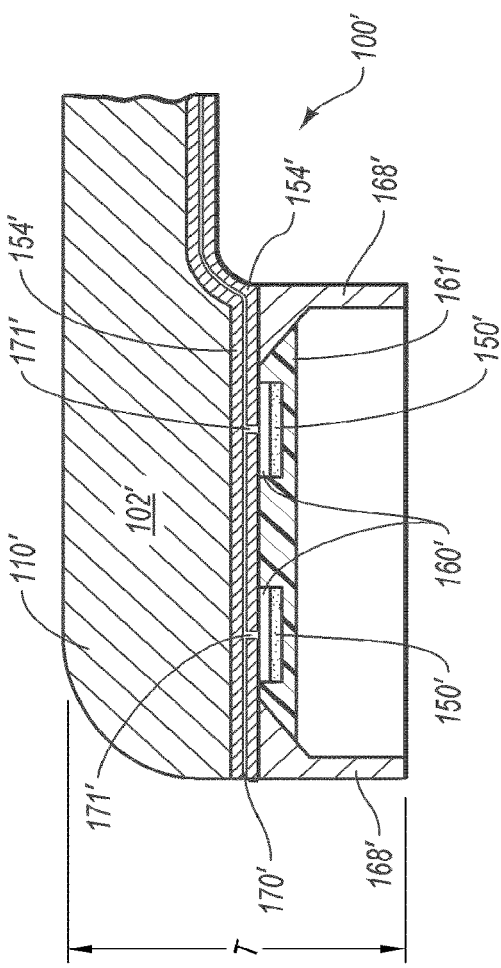
FIG. 5B is a cross-sectional view of the distal head end portion of an alternative dental curing light.

FIG. 5B illustrates an alternative embodiment 100' that does not include a separate LED head assembly, but in which LED dies 160' are directly mounted onto the distal head end 110' of the one piece body itself. As a result, the single piece thermally conductive body 102' does not include an LED assembly hole configured to receive an LED assembly, as the LED die(s) are directly mounted onto the body 102'. The head and neck portions of the device 100' may be solid, while the proximal handle portion may include a cavity for housing electronic control components. Although such a configuration does not as easily allow replacement of one or more dead LED dies or the easy replacement/upgrade of an LED assembly, it does offer the advantage of no seam over which heat must be conducted away from the LED dies into the single piece body. In addition, there are advantageously no intermediate substrate layers in between the LED die 160' and the underlying mounting layer 154'. The elimination of such layers (e.g., primary heat sinks and/or relatively thick substrates) further increases the heat dissipation ability of the device as there are fewer interfaces through which heat must be conducted. The reduction in the presence of such interfaces may further reduce the need for relatively inefficient thermal greases and/or epoxies typically used at the interface between such layers.

Figure 8:
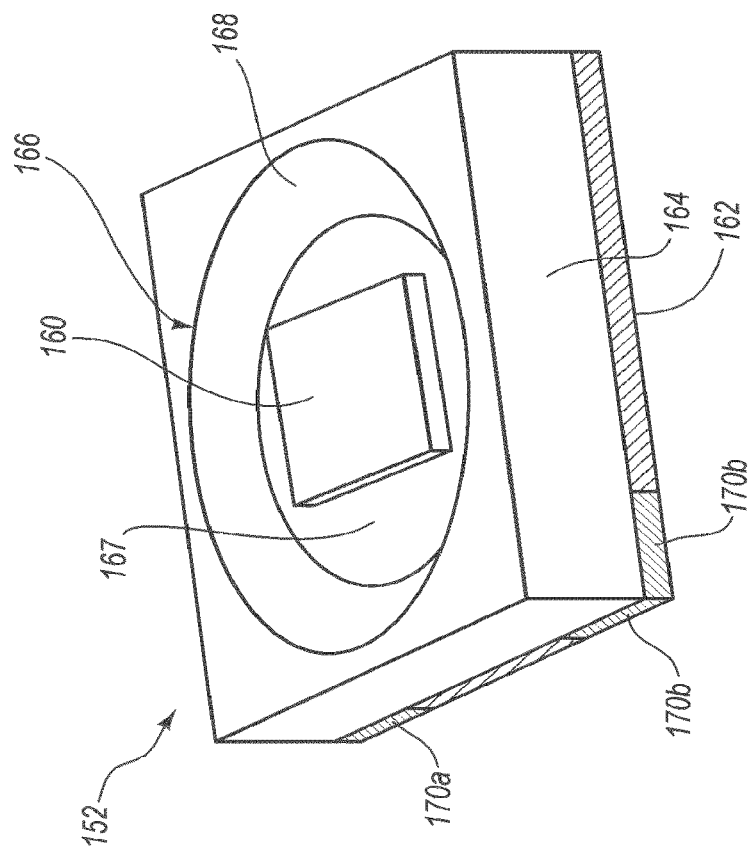
FIG. 8 is a perspective view of an LED assembly of the curing light of FIG. 1.

Such a configuration is also extremely robust and resistant to damage, as it eliminates relatively bulky LED assembly 120, which includes thick assembly substrate 162 and package 164 (FIG. 8). Advantageously, there are no substrate layers between the semiconductor die 160' and the thin thermally conductive/electrically insulative layer 154' over the thermally conductive body. Because each LED die 160' is directly mounted to the thermally conductive/electrically insulative layer 154' of the thermally conductive body 102', resistance to thermal conduction of waste heat generated from each die to the thermally conductive body 102' is advantageously minimized.

As seen in FIG. 5B, at least the distal head end 110' of unitary body 102' includes a thin, electrically insulative and thermally conductive layer 154' (e.g., an oxide or nitride of the underlying metal body substrate) formed directly over the unitary body 102'. The LED dies 160' (without any assembly substrate) are mounted on layer 154' so as to electrically isolate them from the underlying (e.g., metal) substrate. This thin layer 154' has a thickness between about 0.05 micron and about 50 microns, which is sufficient to electrically isolate the LED dies 160' from the underlying unitary body substrate 102'. In some embodiments, it is advantageous for layer 154' to be no thicker than required for electrical insulation because the thermal conductivity of this layer may be significantly less than that of the underlying metal body 102'. For example, the thermal conductivity of aluminum alloy 7075 (e.g., the body 102') is about 130 W/m-K, while that of aluminum oxide (e.g., layer 154') is only about 40 W/m-K. Such issues may be less important depending on the material of layer 154'. For example, aluminum nitride has a thermal conductivity of about 285 W/m-K. The thickness of layer 154' is greatly exaggerated in the Figure for clarity purposes.

Although electrically insulative/thermally conductive layer 154' may have a thickness as low as about 0.05 micron or as thick as about 50 microns, more preferably the thickness of layer 154' is between about 0.1 micron and about 10 microns, and most preferably between about 0.2 micron and about 1 micron.

Layer 154' is also beneficial in minimizing effects of the differences in thermal expansion of the underlying metal or other conductive material body relative to that of the LED dies 160'. In other words, there is often a significant difference between the relatively low coefficient of thermal expansion of the LED die relative to the high coefficient of thermal expansion of a metal body material. The material of layer 154' may be selected so as to exhibit a coefficient of thermal expansion that is between that of the body material (e.g., a metal) and that of the one or more LED dies, helping to minimize any tendency of the underlying body to form micro-cracks and fissures after prolonged temperature cycling during use. In some embodiments, the thermally conductive layer (e.g., 154' or 154) may even be omitted. For example, where the body (e.g., 102') is formed of an electrically insulative material (e.g., carbon fiber, boron nitride, and/or graphene) the thermally conductive layer may be omitted as a result of the excellent thermal conductivity provided by the underlying body material (e.g., body 102'), and the LED dies (e.g., 160') may be directly mounted onto the electrically insulative, thermally conductive body material (e.g., body 102'). Mounting may be accomplished chemically (e.g., by use of a thermally conductive epoxy) and/or by mechanical compression (e.g., using a thermally conductive grease and/or gel).

Figure 7:
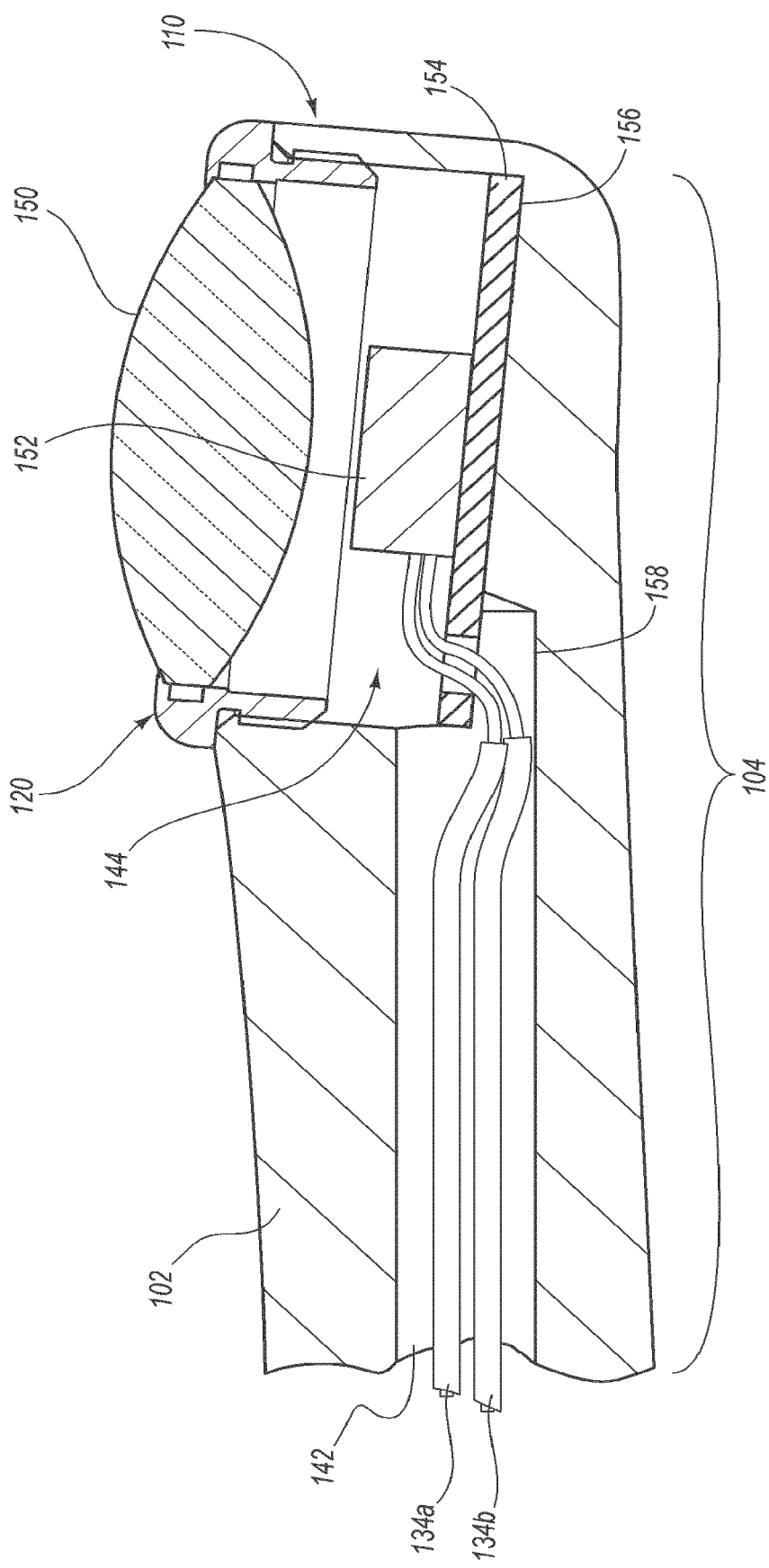
FIG. 7 is a cross-sectional view of the neck and head portion of the curing light of FIG. 1.

According to one embodiment, layer 154' may be applied over the entire unitary metal body substrate 102' or a substantial portion thereof. Layer 154' may be applied by chemical or plasma vapor deposition, plasma flame spraying, or other techniques that will be apparent to those skilled in the art. Power connections to the LED semiconductor dies 160' may be made through gold or other conductive metal traces 170' laid down (e.g., by a deposition process) over the layer 154', electrically insulating the traces 170' from the underlying body 102'. In order to protect traces 170' from damage, the traces may be sandwiched between layer 154'. For example, the layer 154' may actually be laid down as two layers with a total thickness as described above, with the conductive metal traces 170' sandwiched in between. Such a configuration is shown in FIG. 5B. As illustrated, traces 170' may include one or more power connection points 171' where trace 170' is exposed so as to electrically contact LED dies 160'. In the illustrated embodiment, the neck and distal head end may be solid rather than hollow (a hollow example is shown in FIG. 7), as power connections are made by traces 170' rather than wires fed through a hollow head. Providing a solid neck and head may further increase heat dissipation ability of the unitary body, as a significant fraction of the body's mass is available directly adjacent to the heat generating LED dies 160'. Only a single power connection point 171' is shown for each LED semiconductor die 160' for purposes of clarity, although another connection point (or even more than two) may be provided in a different or even the same cross-sectional plane.

Any of the described embodiments may further include a photonic crystal for collimating light. Referring to FIG. 5B, dental curing light 100' is illustrated as further including a photonic crystal 150', which acts as a light collimator. Photonic crystals are periodic optical nano-structures that affect the motion of photons in a similar way as semiconductor crystals affect the motion of electrons. By way of example, some naturally occurring materials, such as opal, peacock feathers, butterfly wings, and iridescent beetles include photonic materials. A photonic crystal operates on a quantum level to capture incoming photons and refract them in a particular way. Photonic crystals are customized to specific wavelengths or ranges that they capture and collimate. Because of this, the crystal would be selected to capture and collimate light of the desired wavelengths (e.g., anywhere between about 350 nm and about 490 nm—the crystal is matched to the LED die).

As compared to a traditional lens, photonic crystals are more efficient at collimating light. In addition, it requires less space so as to provide better focusing/collimating ability in the small available space. Such a crystal may be, for example, about 0.5 mm to about 1 mm thick, which is much less than traditional lenses that act by physically refracting light waves. Light collimating photonic crystals may include photonic structures etched in very thin vapor deposited films. The use of photonic crystals further minimizes the thickness of the distal head end of the device. Although not required, the use of photonic crystals and implementation of direct mounting of LED dies to body 102' (or the body of any of the other described embodiments) rather than using an LED package assembly together works to further minimize the overall structure of the device, for example, allowing for a very thin distal head end that is more maneuverable within the patient's mouth.

The LED dies themselves used with any of the described embodiments may comprise any suitable LEDs configured to emit within the desired spectrum. Exemplary LED dies include inorganic solid-state LED dies and organic LED dies. Organic LED (OLED) dies are light emitting diodes whose emissive electroluminescent layer includes a film of organic compounds. The layer may typically include a polymer that allows suitable organic compounds to be deposited. The organic compounds are deposited in rows and columns onto a flat carrier. The use of OLED dies may further reduce the thickness of the distal head portion of the dental curing light, as OLED dies are flexible and thinner than conventional inorganic solid-state LED dies (e.g., the use of OLED dies alone may reduce thickness by 1-2 mm).

For example, the distal head end of any of the disclosed embodiments may have a thickness less than about 8 mm. More particularly embodiments including direct LED mounted dies, OLEDs, and/or a photonic crystal for light collimation rather than a lens may also have a thickness less than about 8 mm, more preferably less than about 5 mm, even more preferably less than about 2 mm (e.g., as thin as about 1 mm or less).

Figure 5C:
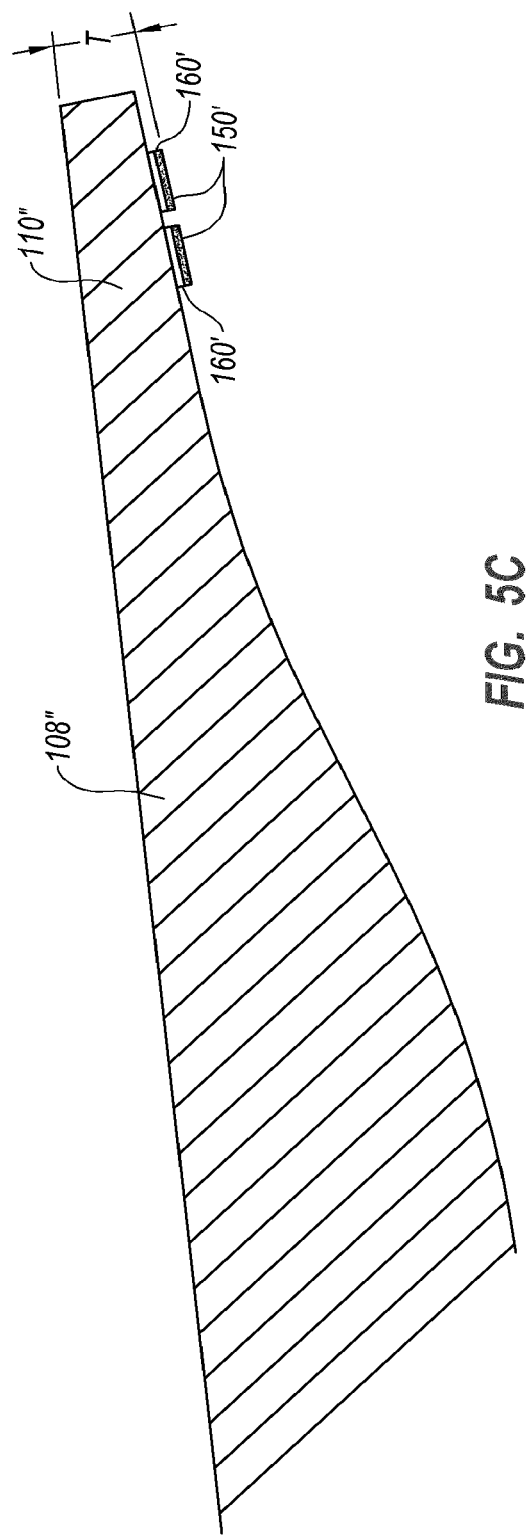
FIG. 5C is a cross-sectional view of the distal head portion of another alternative dental curing light having an alternative configuration.

FIG. 5C shows a cross-sectional view of a dental curing light that may otherwise be similar to that of FIG. 5B, but in which the neck 108" and head portions 110" are differently shaped, maximizing benefits associated with the thinness of the distal head portion 110". For example, a top surface of the body along the transition from the neck 108" to distal head portion 110" is substantially straight and flat, while the underside of the body includes a curvature to transition from the neck portion 108" to the thinnest portion of the device, the distal head 110". The proximal grippable handle portion (not shown) may be shaped and sized similarly to the embodiment shown in FIG. 1, as the handle portion is the widest portion of the device, configured for gripping. Providing a flat top surface throughout neck portion 108" and head portion 110" may maximize maneuverability within the mouth, although alternative configurations may include a flat bottom surface or be curved on both top and bottom surfaces. Head thickness T may be less than about 8 mm, more preferably less than about 5 mm, more preferably less than about 2 mm, or even less than about 1 mm. Of course, use of the above described photonic crystal light collimators, direct mounting of LED dies, as well as the use of OLED dies is not limited to the embodiment described in conjunction with FIGS. 5B-5J, but such features may be used with any of the dental curing lights described herein.

In embodiments where at least one LED die is configured to emit a first peak wavelength (e.g., UV at about 390-410 nm) and another LED die is configured to emit a different peak wavelength (e.g., blue at about 440-480 nm), more than one photonic crystal may be required, as each crystal is customized for a particular peak wavelength. Exemplary photonic crystals may be available from ePIXnet, located in St. Andrews, United Kingdom; Luminus Devices, Inc., located in Billerica, Mass.; Obducat AB, located in Malmo, Sweden, and Daylight Solutions, Inc., located in Poway, Calif.

As illustrated, the device 100' may further include a reflective well 168' within which the LED dies 160' are disposed. Reflective well 168' may further aid in redirection of any emitted light (e.g., not captured by photonic crystal 150' or in embodiments not including crystal 150') in a desired direction. A transparent protective layer 161' (e.g., silicone) may be applied over structures 160' and 150' so as to protect them from being damaged by rough handling or dropping during use. Any features described in conjunction with the embodiments of FIGS. 5B-5J could be adapted for use with any of the other embodiments described herein. For example, one embodiment may include direct mounted LED dies on a separate LED head assembly that is receivable into an LED head assembly hole of the unitary body.

Figure 5E:
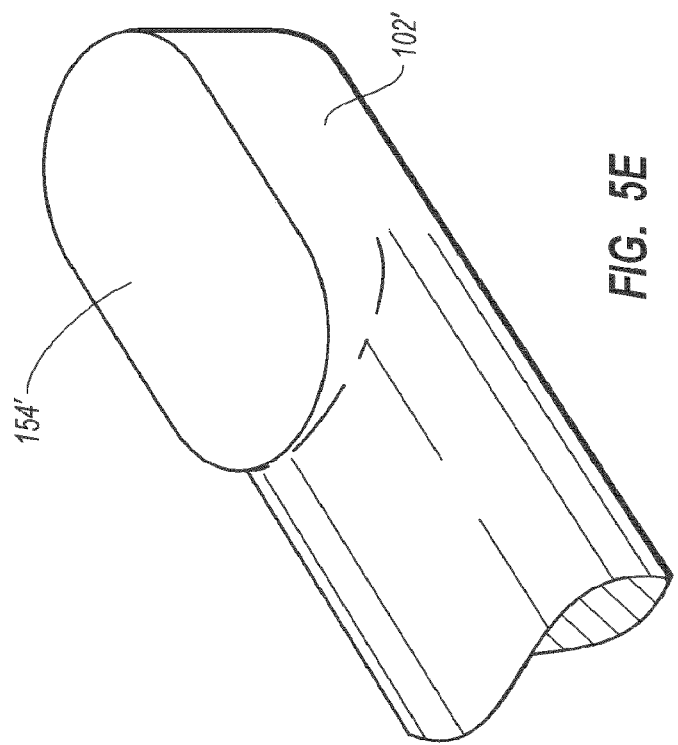
FIG. 5E is a perspective view of the distal head end portion of FIG. 5D once a thin electrically insulative thermally conductive layer has been applied.
Figure 5D:
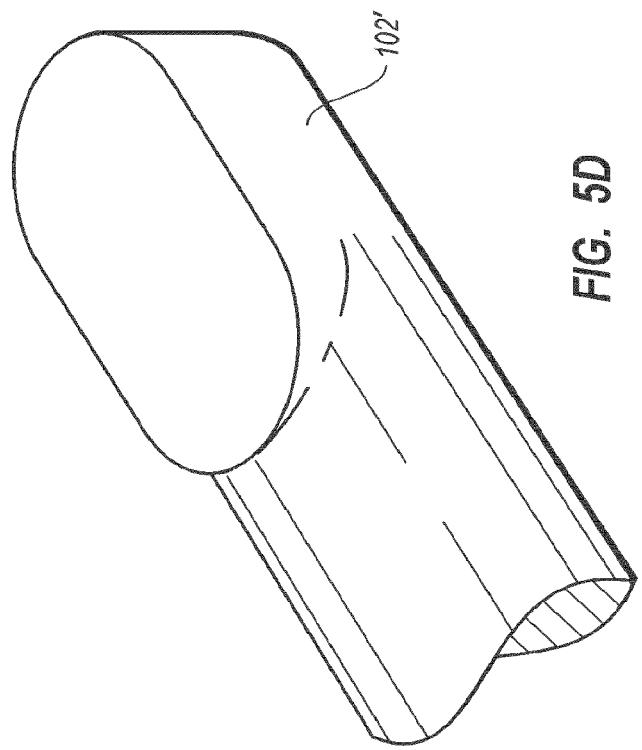
FIG. 5D is a perspective view of the distal head end of the device body of FIG. 5B prior to attachment of the LED dies and associated structures.

According to one method of manufacture, a unitary single piece metallic body 102' is provided, as shown in FIG. 5D. As shown in FIGS. 5E-5F, a thin electrically insulative and thermally conductive layer 154' is formed over at least the distal head end exterior surface of the metal body 102'. The thin layer 154' preferably comprises an oxide or nitride of the underlying metal body material 102' (e.g., in embodiments where body 102' is metallic). It may be applied by chemical or plasma vapor deposition, plasma flame spraying, or other techniques that will be apparent to those skilled in the art. Conductive traces 170' may be applied so as to be sandwiched between the electrically insulative/thermally conductive layer 154'.

Figure 5G:
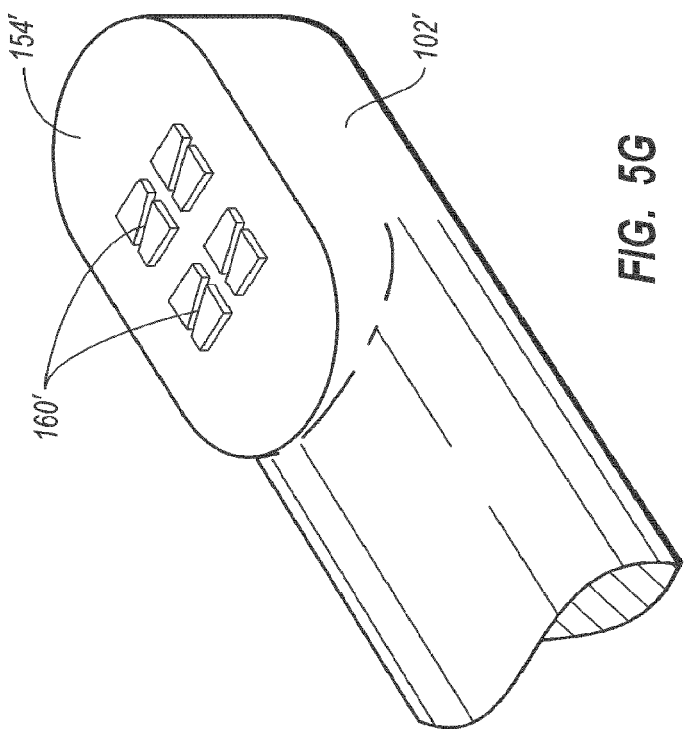
FIG. 5G is a perspective view of the distal head end portion of FIG. 5E once the LED dies have been directly mounted to the body.
Figure 5H:
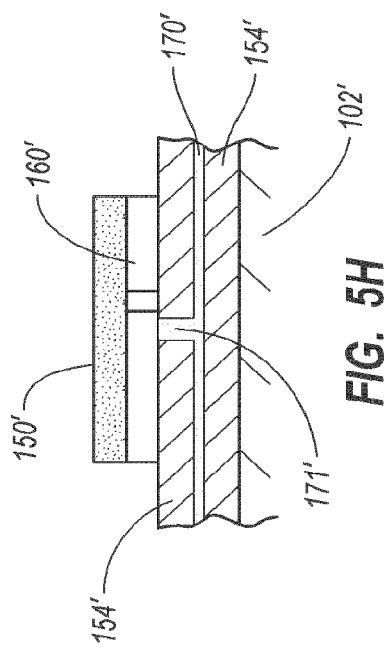
FIG. 5H is a cross-sectional view of the distal head end portion of FIG. 5G.
Figure 5F:
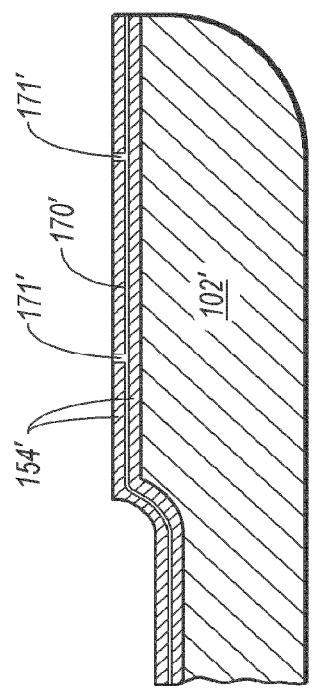
FIG. 5F is a cross-sectional view of the distal head end portion of FIG. 5E.

As shown in FIGS. 5G-5H, one or more LED dies 160' are then laid down and bonded directly to an exterior surface of the thin electrically insulative/thermally conductive layer 154', for example, with a thermally conductive epoxy. The thickness of any such epoxy layer is minimized so as to be extremely thin so that its effect on resistance to thermal conductivity is negligible, as thermally conductive thermal epoxies, although characterized as thermally conductive, are still relatively poor thermal conductors (e.g., perhaps as little as 1 W/m-K). Minimization of the thickness of any such layer minimizes its negative effect on heat dissipation. Photonic crystals 150' may be attached over LED dies 160' so as to receive emitted light.

Figure 5I:
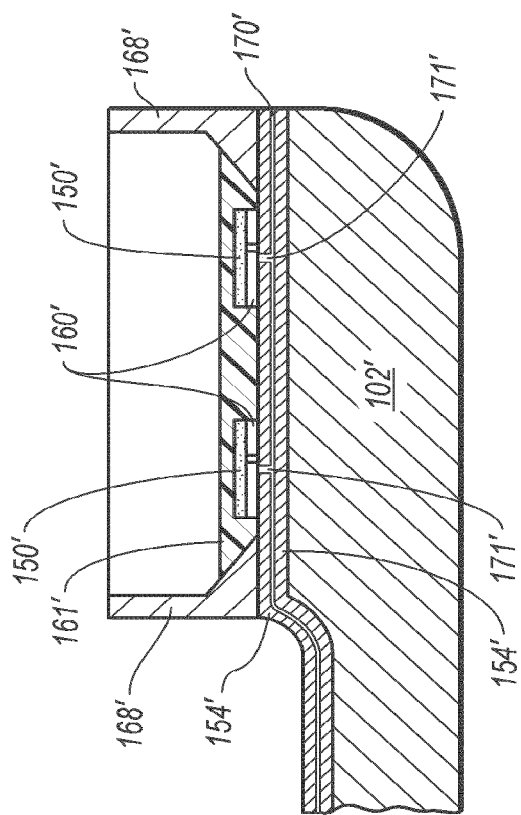
FIG. 5I is a cross-sectional view of the distal head end portion of FIG. 5H once a reflective well has been built up around the LED dies.
Figure 5J:
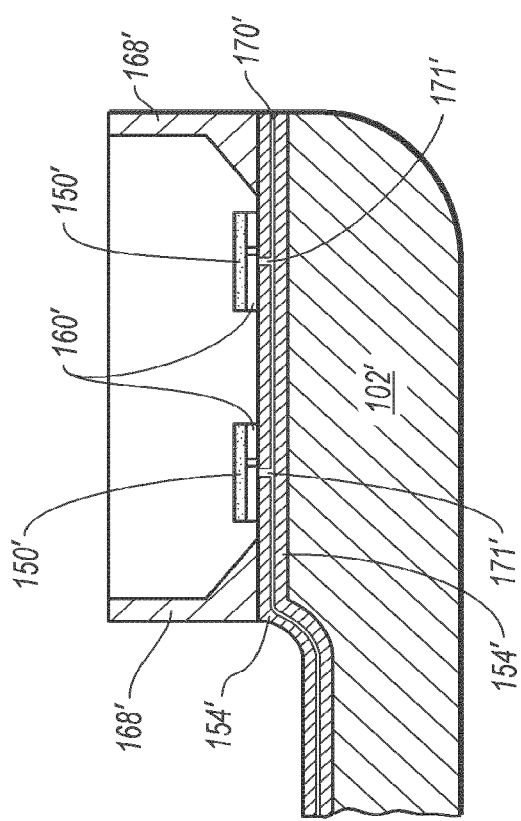
FIG. 5J is a cross-sectional view of the distal head end portion of FIG. 5I once a protective layer has been applied over the LED dies.

As shown in FIG. 5I, a reflective well 168' may be attached to the distal head end 110' of body 102' such that dies 160' are enclosed within reflective well 168'. Although it may be possible to install reflective well 168' prior to mounting dies 160', it is preferred to mount dies 160' on a completely flat, smooth surface to ensure good contact with the power connections 171' and underlying thermally conductive/electrically insulative layer 154'. Accordingly, reflective well 168' is preferably attached at a later stage. Finally, as shown in FIG. 5J, a silicone or other hardenable or curable resin protective coating may be applied over dies 160' and photonic crystals 150' so as to protect these delicate structures from damage. Additional details of embodiments including direct mounted LED dies may be found in U.S. Patent Application Ser. No. 61/141,482 filed Dec. 30, 2008, previously incorporated by reference.

The dental curing device can have any shape suitable for use as a curing device. In one embodiment, the dental curing device can have an elongate shaped body to facilitate use of the device in the mouth of a patient. An elongate shape of the dental curing device is but one example of a dental curing light within the scope of the invention. It will be appreciated that the dental curing light may have other shapes suitable for use in curing a dental composition within, or even outside, a patient's mouth. For example, curing lights known in the art having a gun-like configuration may incorporate any of the features disclosed herein. In general, any known curing light configuration may be used in connection with the features described herein.

Because the device body serves as a heat dissipater, there is no requirement for a cavity, opening, or other configuration of the device body to accommodate a separate metal body thermally coupled to the LED with sufficient heat capacity to function as a heat sink. The ability to remove the "traditional heat sink" from the dental curing light devices described herein allows for a low profile dental curing light device to be manufactured. In particular, the neck and head portions can be made much smaller and/or thinner and/or accommodate larger LED assemblies compared to dental curing lights that use a separate heat sink housed within the head or neck portions of the curing light devices. An embodiment including an extremely thin distal head is shown in FIG. 5C.

Because device body 102 comprises a thermally conductive material, it can serve as a heat conductor and dissipater. Furthermore, the device body 102 can be made more solid and thinner as compared to the housing of plastic body dental curing lights. In one embodiment, the thermally conductive body material is of a metal construction that provides increased strength and durability while still achieving a smaller, more maneuverable curing light.

In one embodiment, the handle portion of the device body can have a thickness in a range from about 10-40 mm, more preferably about 15-30 mm. Such dimensions provide for comfortable gripping by the user. The neck and head portions are thinner than the handle portion and can have a thickness in a range from about 1-15 mm, more preferably about 1-10 mm. As described above, a head portion thickness less than about 8 mm, more preferably less than about 5 mm, or even less than about 2 mm may be possible when using one or more of direct die mounting, photonic crystal light collimation, or organic LEDs.

Protective Coating

In one embodiment, all or a portion of the exterior surface of the device body includes one or more coatings. For purposes of this invention, the exterior surface of device body 102 is the surface that is exposed in the assembled curing light or covered by a coating layer that does not substantially change the shape of the surface. For example, in the embodiment illustrated in FIGS. 1-5, the surface of neck portion 108 is an exterior surface, but the surface of interior cavity 136 is not an exterior surface since electronics assembly 112 covers up the surface. Similarly collar 140 as illustrated in FIGS. 1-5 is not an exterior surface since it is covered by protective sleeve 118. However, if desired, portions of device body 102 that do not provide an exterior surface may be coated.

Figure 6:
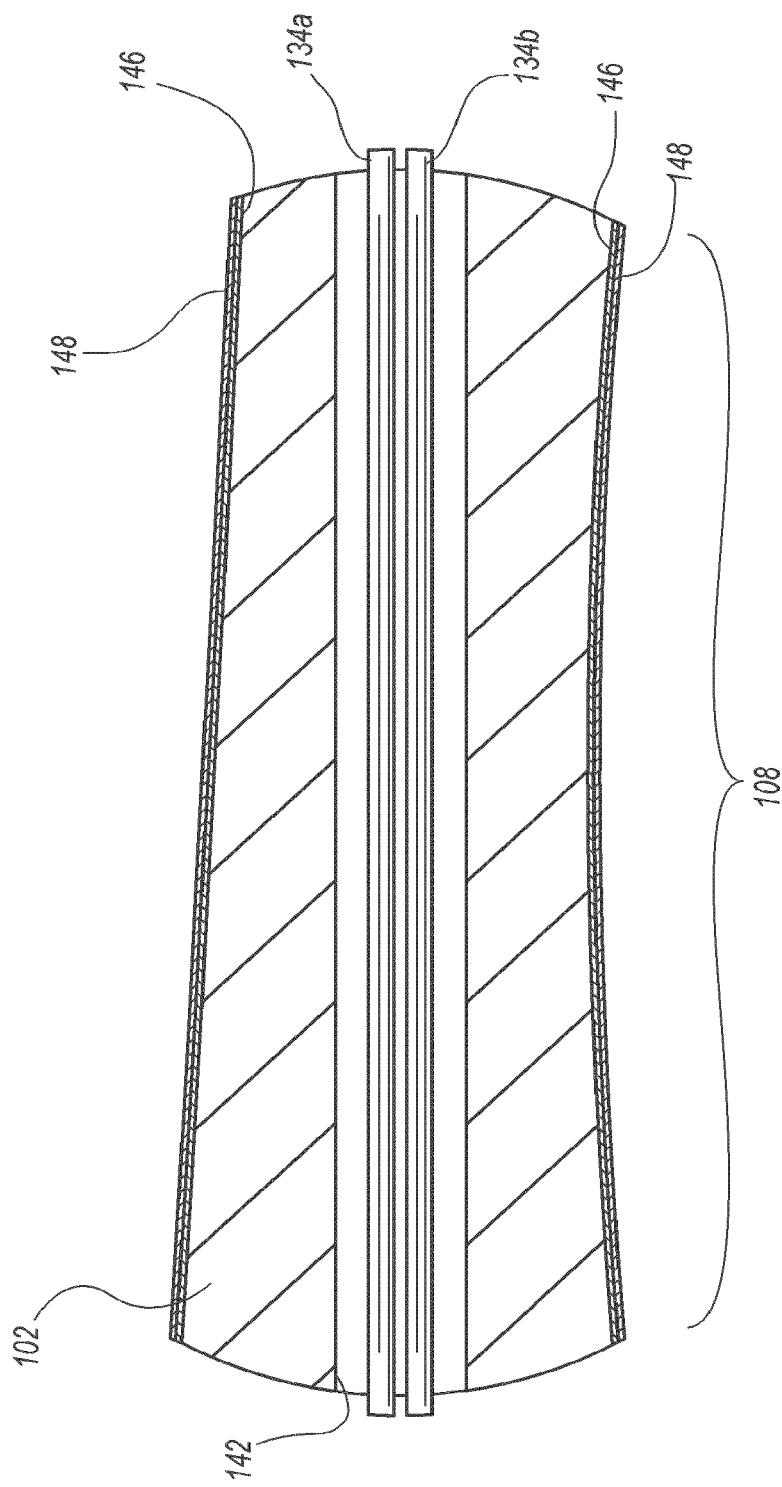
FIG. 6 is a cross-sectional view of a portion of the neck of the device body of FIG. 1 showing a scratch coating and a fluoropolymer coating covering the surface thereof.

The exterior surface of device body 102 may be coated with one or more coatings to protect the surface and/or to facilitate cleaning and/or sterilizing the curing light 100. In one embodiment, the exterior surface of device body 102 may be coated with a scratch resistant coating and/or a fluoropolymer coating. FIG. 6 is a cutaway view of a portion of the neck portion 108 of device body 102 illustrating a protective coating. A scratch resistant coating 146 is positioned adjacent the surface of device body 102. The coating layers may be applied by chemical or plasma vapor deposition, plasma flame spraying, or other techniques that will be apparent to those skilled in the art.

Scratch resistant coating 146 can be a thin layer of any material that has a hardness greater than the body material of device body 102. In one embodiment, the scratch resistant layer can be a metal oxide or a metal nitride. The scratch resistant layer may be the same as the thermally conductive layer. In one embodiment, the scratch resistant coating 146 can be an anodized layer formed on the surface of a metallic device body 102. For example, where the metallic body material includes aluminum, anodizing the surface of the device body 102 creates an aluminum oxide surface. In a preferred embodiment, the scratch resistant coating 146 is between about 0.05 micron to about 100 microns thick (not shown to scale in FIG. 6). Preferably the thickness is greater than about 1 micron, more preferably greater than about 10 microns, and most preferably greater than about 25 microns. In one embodiment, the thickness can be in a range from about 1 micron to about 40 microns or, alternatively, in a range from about 5 microns to about 50 microns.

While the thickness of the scratch resistant layer can depend somewhat on the material being used and the desired scratch resistance, for anodized aluminum, the thickness of the scratch resistant layer must be substantially greater than about 5-15 nm, which is the thickness of self-passivated aluminum, which is known to not have a thickness sufficient for imparting scratch resistance.

In a preferred embodiment, the hardness of the scratch resistant coating is greater than about 55, more preferably greater than about 60, and most preferably greater than about 65 on the Rockwell C scale. The hardness is typically in a range from about 60-90, more preferably about 65-80 on the Rockwell C scale. Examples of suitable scratch resistant coatings include aluminum oxide, aluminum nitride, chrome nitride, chrome oxide, zirconium oxide, titanium nitride, tungsten carbide, silicon carbide, chrome carbide, and combinations thereof.

The fluoropolymer coating 148 that may be applied to an exterior surface of the device body can provide a surface that minimizes friction so as to render device highly maneuverable within the mouth. Furthermore, the device is easily sterilized and less prone to retain bacteria and/or debris, which is important since the dental curing light is used in the mouth of a dental patient and must be cleaned between uses to avoid contamination and infection between dental patients. In one embodiment, the fluoropolymer coating has a thickness in a range from about 0.05 micron to about 10 microns, more preferably about 0.1 micron to about 1 micron. Examples of suitable fluoropolymers include, but are not limited to, polytetrafluoroethylene, perfluoroalkoxy polymer, fluorinated ethylene-propylene, polyethylenetetrafluoroethylene, polyethylenechlorotrifluoroethylene, polyvinylidene fluoride, polychlorotrifluoroethylene, and combinations of these. Although perhaps not technically a fluoropolymer, a parylene coating (e.g., applied by chemical vapor deposition) may additionally or alternatively be applied. Parylene is a polymer manufactured from di-p-xylylene. It can be applied in a thin, clear layer, and is biocompatible. As used herein, "fluoropolymer coating" is to be broadly construed to also include parylene coatings. Parylene coatings may include Parylene N, Parylene C, Parylene D, Parylene AF-4, Parylene SF, Parylene HT, Parylene A, Parylene AM, Parylene VT-4, Parylene CF, and Parylene X.

The fluoropolymer coating 148 may be used alone or in combination with the scratch resistant coating 146. However, the use of a scratch resistant coating 146 under fluoropolymer coating 148 has been found to provide substantial benefits that cannot be achieved by either layer alone. For example, fluoropolymer coating 148 can be difficult to bond to some metallic surfaces. In one embodiment, the scratch resistant coating 146 is selected to provide good adhesion of the fluoropolymer coating 148 to the exterior surface of device body 102. For example, metal oxides such as aluminum oxide provide good bonding between aluminum alloys and fluoropolymers such as polytetrafluoroethylene.

The scratch resistant coating 146 can also prevent abrasion of fluoropolymer coating 148, even in embodiments where the scratch resistant coating is positioned below the fluoropolymer coating. The hardness of the scratch resistant coating helps to prevent the formation of dents within the body material, so that the exterior surface remains smooth, and objects or materials contacting the fluoropolymer surface will slide off the surface without substantially abrading the surface. If a scratch, dent, or other defect were to develop on the surface of the device body, the fluoropolymer coating may be more easily abraded at the edge of the defect. The inclusion of the scratch resistant coating 146 helps to prevent this from occurring. The scratch resistant coating and/or the fluoropolymer coating may each comprise a single layer or one or both may include two or more sublayers.

Head Portion Including LED and Thermally Conductive Layer

In one embodiment, the head portion 110 of device body 102 includes an LED assembly 120 that allows a dental practitioner to illuminate a polymerizable composition and cause the polymerizable composition to cure. FIG. 7 is a partial cutaway view of dental curing light 100 illustrating the distal end portion 104 in greater detail. Head portion 110 supports or contains LED assembly 120. LED assembly 120 may include a lens 150, an LED package 152, and a thermally conductive layer 154. In the embodiment of FIG. 7, thermally conductive layer may comprise a separate, relatively thick member that is secured to body 102, rather than being a very thin layer applied by vapor deposition or plasma flame spraying techniques, as that shown in FIGS. 5B and 5D-5J. Of course, an alternative in which a relatively thin thermally conductive layer is applied to body 102 (e.g., by vapor deposition or plasma flame spraying) is possible.

LED package 152 and thermally conductive layer 154 are disposed within cavity 144. Wires 134 and 134b extend through passageway 142 and provide power to LED package 152. LED package 152 and thermally conductive layer 154 are secured to the floor 156 of cavity 144. Floor 156 is typically flat to facilitate good contact between thermally conductive layer 154 and the surface of floor 156. However, other configurations can be used so long as the surface area in contact between the device body 102 and the thermally conductive layer 154 is sufficient to quickly conduct the heat produced by the one or more LED dies through thermally conductive layer 154 during use. Thermally conductive layer 154 can be thermally coupled, bonded, or otherwise secured to floor 156 using any technique that ensures good thermal contact. Thermally conductive layer 154 is thermally coupled to LED package 152 through LED assembly substrate 162, which may be part of package body 164, which is described more fully below with reference to FIGS. 7-8.

The thermally conductive layer 154 includes at least a first layer of a highly thermally conductive material. The thermal conductance of the first layer material is preferably greater than about 150 W/m-K, more preferably greater than 170 W/m-K, even more preferably greater than 200 W/m-K, and most preferably greater than about 300 W/m-K. In one embodiment the conductivity can be in a range from about 150 W/m-K to about 2000 W/m-K, more preferably about 170 W/m-K to about 500 W/m-K. Examples of first layer materials that may be used to make thermally conductive layer 154 include, but are not limited to, aluminum nitride, beryllium oxide, diamond, silicon carbide, boron nitride, nanomaterials of carbon (e.g., carbon fiber, carbon nanotube fiber, and/or graphene), beryllium oxide, boron nitride, and/or other thermally conductive ceramics and/or thermally conductive particulate metals and/or ceramics and/or derivatives thereof and/or combinations thereof.

In one embodiment, the first layer of the thermally conductive layer 154 is not electrically conductive. The use of non-electrically conductive materials in the first layer allows the thermally conductive layer to include traces. The traces can be patterned to electrically couple to the contacts of the LED assembly substrate to provide power to the LED dies. The traces can be made from any material useful for making traces, such as, but not limited to, gold, copper, silver, platinum, or aluminum. In one embodiment, the traces can be provided by a copper pad or plate.

In one embodiment, the first layer of the thermally conductive layer 154 is made of a material that has a coefficient of thermal expansion that is substantially matched to a coefficient of thermal expansion of the LED assembly substrate 162.

In one embodiment the thermally conductive layer can be a thermally conductive printed circuit board. The thermally conductive printed circuit board can be a ceramic circuit board or a metalized printed circuit board. Those skilled in the art of circuit boards are familiar with techniques for manufacturing thermally conductive printed circuit boards.

In one embodiment, the thermally conductive layer can include a deformable layer such as a thermally conductive deformable pad and/or a thermally conductive gel or grease layer. Typically the deformable layer is positioned below the first layer (i.e., adjacent the device body). Examples of thermally conductive greases include silicon greases, polymer greases, metalized greases, and nanoparticle greases. Nano-particle greases typically include a thermally conductive filler (e.g., ceramic, carbon, or diamond).

Examples of thermal gels are available from the following companies at the following website, the content of which is hereby incorporated herein by reference:

ShinEtsu: http://www.microsi.com/packaging/thermal_gel.htm

AiT Technology: http://www.aitechnology.com/products/thermalinterface/thermgel/

Ultra +5: http://www.tigerdirect.com/applications/SearchTools/item-details.asp?EdpNo=3298395&CatId=503

Masscool Thermal Gel: http://www.tigerdirect.com/applications/searchtools/item-details.asp?EdpNo=480215&csid=_21

The thermally conductive grease, gel, or adhesive can include a filler material to improve thermal conductivity. Examples of thermally conductive filler materials include aluminum nitride, beryllium oxide, carbon, diamond, silicon carbide, boron nitride, and combinations of these and/or nanomaterials thereof. In some embodiments, a separate thermally conductive layer 154 may not be required. For example, depending on the characteristics of the LED assembly and the LED assembly substrate 162 included therein, no additional thermally conductive layer 154 may be required. In such an example, the LED assembly substrate 162 effectively serves as a sufficient thermally conductive layer, and may simply be coupled to the underlying body of the dental curing light with a thermally conductive grease, gel, or adhesive. Such LED assembly substrates 162 would preferably have surface area and thickness characteristics similar to the characteristics described herein relative to a separately employed thermally conductive layer 154.

In a preferred embodiment, the thermally conductive layer 154 has a higher thermal conductivity than the thermal conductivity of the material used in the device body (e.g., the material that forms the surface of floor 156, for example an aluminum alloy).

The thermally conductive layer 154 is thin relative to body 102 and therefore lacks sufficient mass and heat capacity to serve as a heat sink. In one embodiment, the thickness of the thermally conductive layer 154 is in a range from about 100 microns to 1.5 mm, more preferably about 200 microns to about 1 mm and most preferably about 500 microns to 900 microns. The thickness of such layer 154 is significantly greater than embodiments in which the thermally conductive layer comprises a layer applied by vapor deposition or plasma flame spraying techniques. For example, such layers may only have a thickness between about 0.05 micron and about 50 microns. In any case, the thermal conductivity of the layer 154 is sufficiently high that the thermally conductive layer 154 serves as a conduit to dissipate heat from the one or more LED dies to the material of the device body. In this manner, the material of the device body can serve as a highly efficient heat dissipater. The surface area coupling the thermally conductive layer to the device body is sufficiently large that a majority of heat being conducted by the thermally conductive layer is transferred to the device body.

The thermally conductive layer 154 is thermally coupled to the LED package 152 and the device body 102. The thermal coupling of the thermally conductive layer 154 to the LED package 152 and the device body 102, in combination with the thickness of the thermally conductive layer, can be selected to ensure that most, if not essentially all, the heat generated by the LED dies during use of the curing light 100 is quickly conducted into the body material for dissipation. Because the configuration is so efficient at conducting heat away from the LED dies, low to moderate temperatures are maintained, even during continuous operation.

In a preferred embodiment, layer 154 has substantially more contactable planar surface area than package 152. Oversizing the thermally conductive layer 154 can significantly improve heat dissipation by transferring heat to the device body around the periphery of LED package 152. The use of the device body as a heat dissipater allows ample surface area in which the thermally conductive layer can transfer heat at a significant rate from the LED package 152. Thus, the thermally conductive layer utilizes the heat capacity of the device body much better than directly coupling the LED package 152 to the device body. In general, because the thermally conductive layer 154 has a higher thermal conductivity than the device body, the larger the surface area coupling the thermally conductive layer 154 and the device body 102, the greater the rate of heat transfer to the device body.

The use of a thermally conductive layer in contact with sufficient surface area of a device body has been found to provide surprisingly good heat dissipation from the LED package. The configuration used in the present invention essentially obviates the long existing problems associated with over-heating in LED-based curing lights.

As mentioned, the thermally conductive layer 154 can have a thermal conductivity that is greater than that of the device body. In one embodiment, the thermally conductive layer 154 has a higher thermal conductivity than aluminum alloys. While the device body can be made from several different materials, aluminum alloys have been found to provide a good balance between heat capacity/thermal conductivity and manufacturability and durability of the device body. Although aluminum alloys tend to have poorer heat transfer characteristics than pure aluminum, the thermally conductive layer provides quick dissipation to a sufficiently large area of the aluminum alloy to overcome the disadvantages of using aluminum alloys compared to pure aluminum. This is a surprising and unexpected result.

As shown in FIG. 7, curing light 100 may include a focusing lens 150 used to focus the light generated by LED package 152. The focusing lens 150 can be any lens suitable for collimating light with the wavelengths and light intensities utilized in the dental curing light 100. As shown in the accompanying figures, the lens 150 may be disposed over the head cavity 144 such that the lens 150 does not extend past an outermost surface of the unitary, one-piece body 102. While FIG. 7 illustrates a traditional refractive lens configuration, the present invention may include other types of lenses, including photonic crystals for light collimation.

Figure 9:
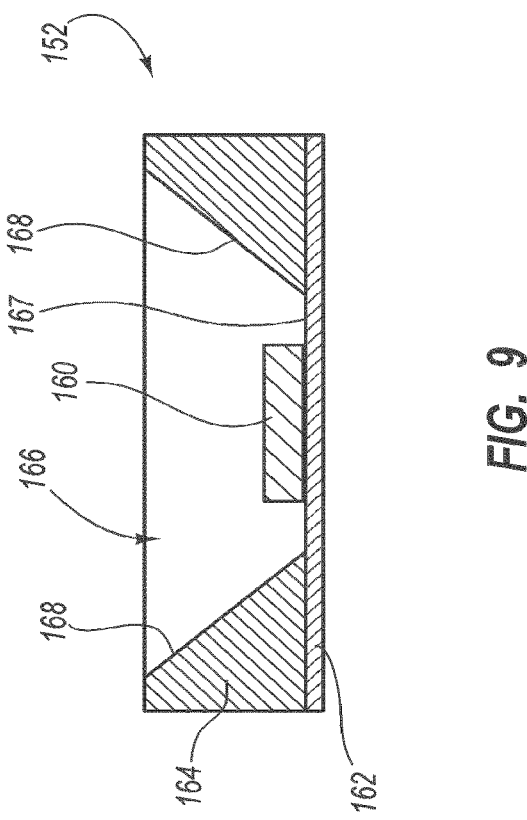
FIG. 9 is a cross-sectional view of the LED assembly of FIG. 8.

In one embodiment, assembly 120 includes the one or more LED dies in a package. Any LED package suitable for use in curing polymerizable compositions that can be coupled to a thermally conductive layer, and thereby coupled to the device body 102, can be used in the present invention. Moreover, two or more LED packages having one or more additional LED dies emitting at the same or a different wavelength can be used in the dental curing lights of the present invention. An exemplary LED package 152 is illustrated in FIGS. 8-9. LED package 152 includes an LED die 160 that is mounted on an assembly substrate 162 of package body 164. Assembly substrate can be used alone or in combination with any other features of an LED package. For example, in the non-limiting example shown in FIGS. 7 and 8, package body 164 surrounds LED die 160 and forms a package cavity 166 having a floor 167. Package cavity 166 typically has a slanted wall 168. Wall 168 and/or other surfaces of package 152 can be coated with a reflective coating to limit absorption of light generated by LED die 160 and maximize light output. In addition, the same or a different reflective coating can be applied to internal surfaces of head cavity 144 and head 110 to minimize absorption of light from LED die 160. Examples of suitable reflective materials include, but are not limited to, noble metals, preferably rhodium. In one embodiment, package 152 can have a reflective collar and/or an antireflective coating similar to the collar and anti-reflective coating described below in conjunction with FIG. 13.

LED assembly substrate 162 can comprise any material suitable for supporting LED die 160, so long as substrate 162 has a sufficiently high thermal conductivity to transfer heat from die 160 to thermally conductive layer 154 (FIG. 7). In one embodiment, substrate 162 can be formed of the same or a similar material as the first layer of thermally conductive layer 154. LED assembly substrate can be made from one or more sublayers and can be made from one or more different thermally conductive materials so long as the desired thermal conductivity is maintained. LED die 160 can be provided as a prepackaged LED package or alternatively, the LED package can be created in-situ on the device body.

The LED dies are selected to emit at a desired wavelength for curing a polymerizable composition. The LED die is typically configured to emit at a particular wavelength within the range from about 350 nm to about 490 nm, although the invention is not necessarily limited to devices that emit at these wavelengths. Light curable dental compositions typically include light activated initiators that only respond to a very narrow range of wavelengths. For example camphorquinone is activated by blue light, while many proprietary initiators are activated by UV light. LED dies that are selected to operate at the desired wavelength are important for achieving curing in the desired manner and time interval for the particular polymerizable composition. In one embodiment, the LED package can have one or more LED dies configured to emit light at a particular frequency in a range from about 350 nm to about 490 nm. In a preferred embodiment, the LED package can emit light at least in the UV spectrum and separately or simultaneously in the blue spectrum. Examples of suitable LED packages and dies that can be used in the dental curing lights of the present invention are disclosed in U.S. Pat. No. 7,473,933 to Yan, which is hereby incorporated herein by reference.

Power connections to the LED die 160 can be made through contacts 170a and 170b. In this embodiment, the contacts may be embedded in substrate 162. However, in other embodiments, contacts may be placed in other structures of the package body or other components of the LED assembly. Contacts and traces to LED die 160 may be made from gold or other conductive metal traces deposited using known techniques such as, but not limited to, deposition techniques. While LED package 152 has been illustrated as receiving power from wires 134 a and 134 b, power can be supplied using traces or leads or any other technique suitable for delivering power to the LED die. In one embodiment, traces to LED package 152 can be embedded in an electrically insulative coating such as the scratch resistant coating or an applied thermally conductive layer as described in conjunction with FIGS. 5B and 5D-5J. In this embodiment, the electrical contact (e.g., wires or traces) between head 110 and cavity 136 can travel along the outside of neck portion 108 of device body 102. The wires or traces can be embedded in the coating by using a first electrically insulating layer such as aluminum oxide beneath the traces and then another electrically insulating coating layer such as aluminum oxide above the traces. The insulating coating layers can be aluminum oxide, aluminum nitride or any other suitable electrically insulating coating. The lower insulating layer can be formed by anodizing an aluminum body and the upper insulating layer can be formed by plasma flame spraying.

Figure 10:
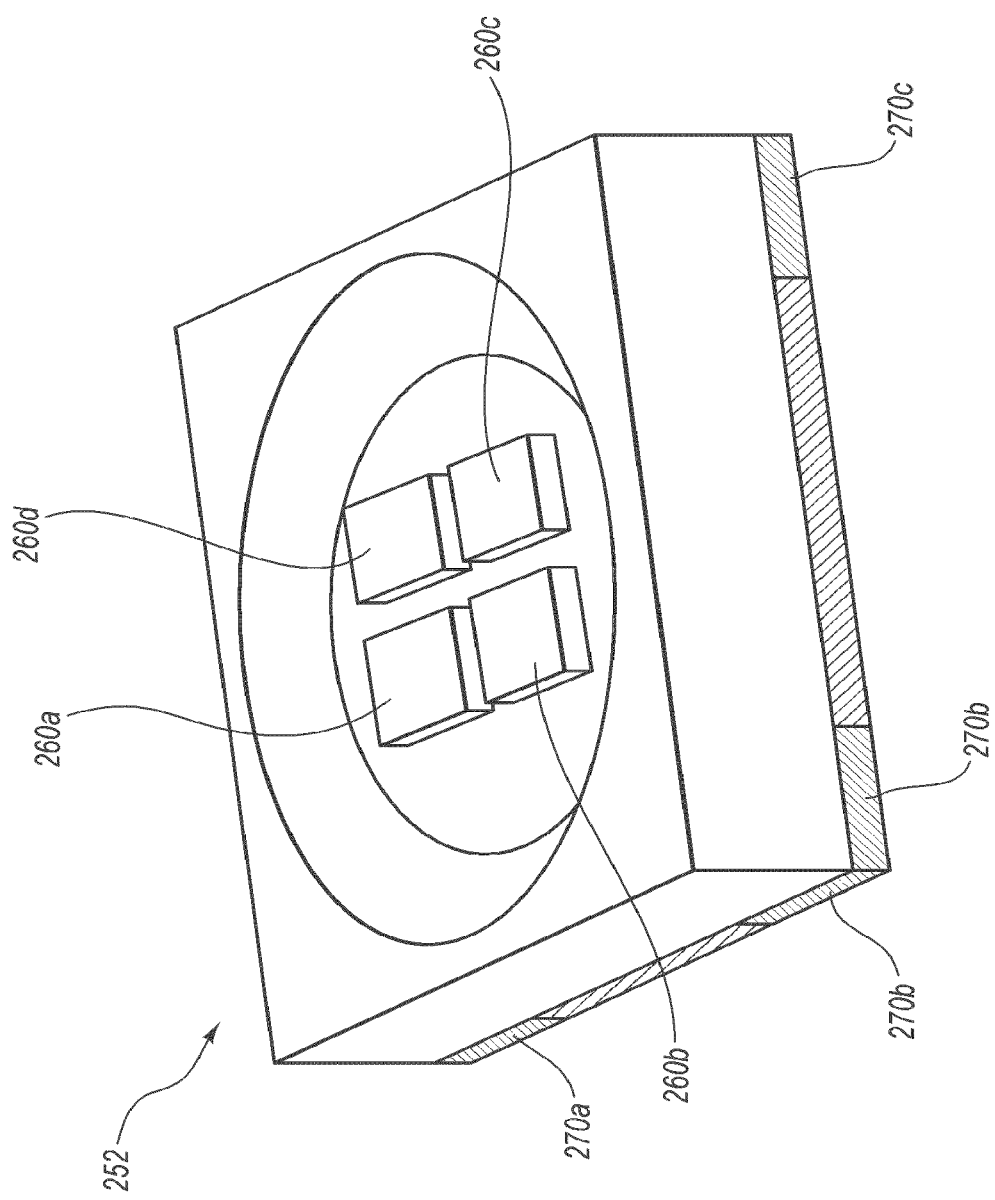
FIG. 10 is a cross-sectional view of an alternative LED assembly including a plurality of LED dies.

FIG. 10 illustrates an alternative embodiment of the invention including a plurality of LED dies 260a, 260b, 260c, and 260d. The use of multiple dies allows the package 252 to emit at more than one wavelength and/or emit more light at one wavelength. In one exemplary embodiment, LED dies 260a and 260b are configured to emit light in a range from about 460 nm to about 470 nm, die 260c is configured to emit light in a range from about 445 nm to about 455 nm, and die 260d is configured to emit light in a range from about 400 nm to about 410 nm (e.g., about 405 nm). LED package 252 can include any number of dies so long as there is physical space available for the die footprint. The LED dies may be configured to emit light at any frequency suitable for curing a light polymerizable composition. LED package 252 includes contacts 270a-270c for driving LED package. The LED dies can be driven in series or parallel and at voltages and power outputs similar to those discussed with respect to FIGS. 1-9.

Alternative Dental Curing Lights

Figure 12:
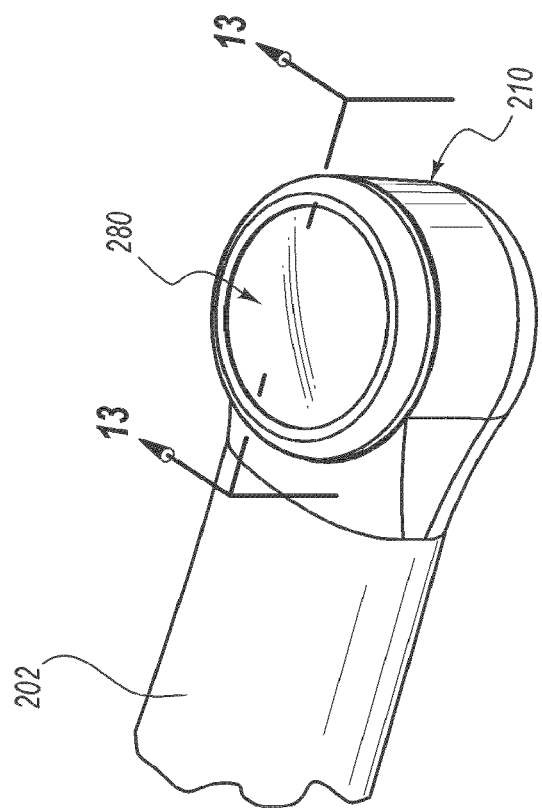
FIG. 12 illustrates the head and neck portion of FIG. 11 with the removable member coupled into the well of the distal head portion.
Figure 11:
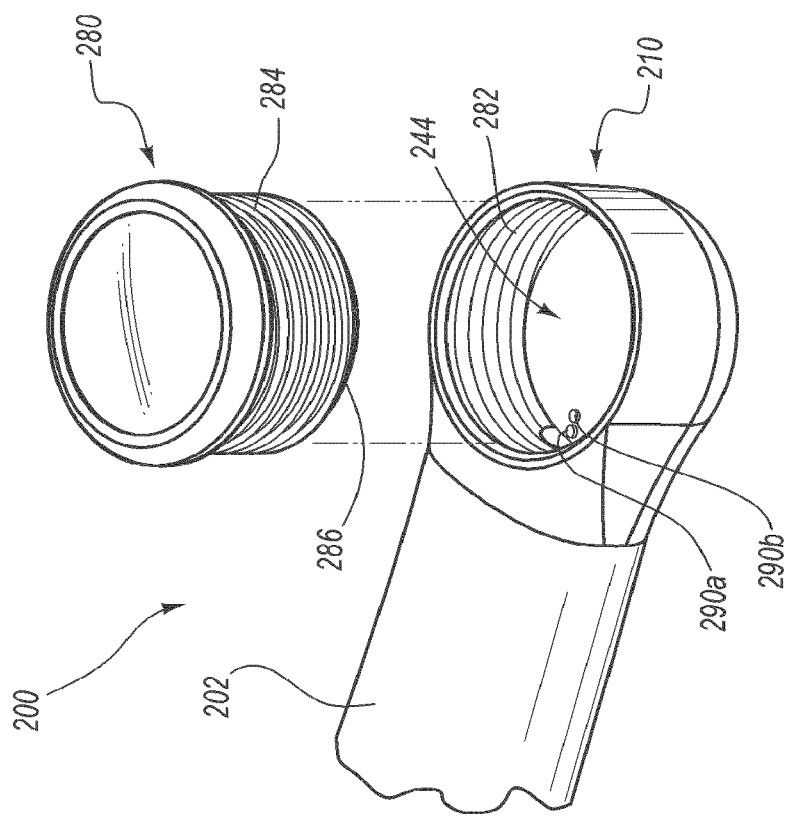
FIG. 11 is a partial exploded view of the neck and head portion of an alternative embodiment showing a removable member housing an LED assembly.
Figure 13:
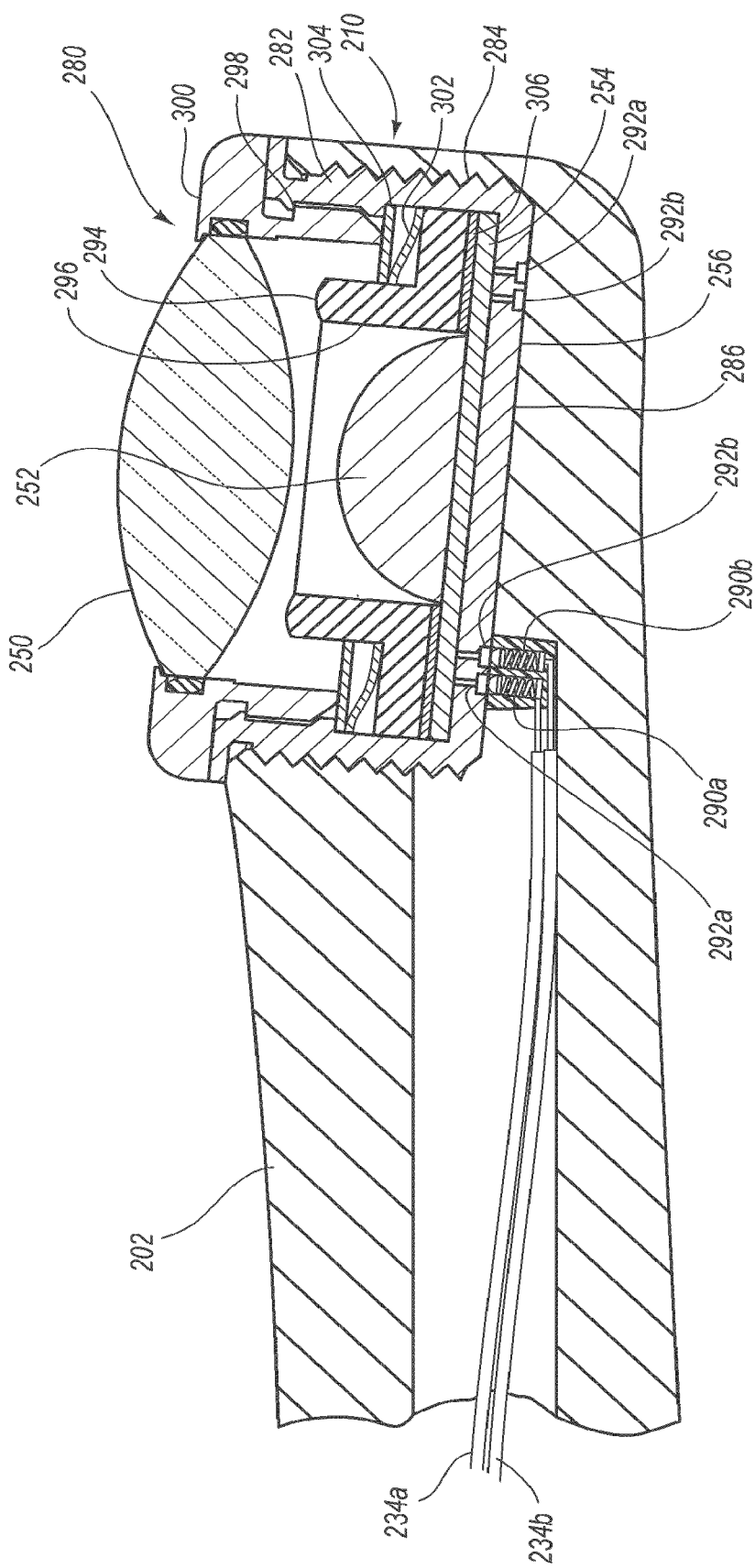
FIG. 13 illustrates a cross sectional view of the distal head portion and neck portion of the device of FIG. 12.

FIGS. 11-13 illustrate an alternative dental curing light 200 that includes a head portion having a removable cup-like member 280. Removable member 280 houses an LED package 252 that is coupled to removable member 280 using a thermally conductive layer 254. The thermal conductance between LED package and device body 202 is the same as for curing light 100 except that head 210 includes coupling means for securing member 280 to a part of head 210.

In one embodiment, the coupling is provided by a threaded body 282 and threads 284 on member 280 allows removable member 280 to be screwed into threaded body 282 of head 210. A floor 256 of well or cavity 244 is in intimate contact with a bottom surface 286 of removable member 280. The relatively large surface area of bottom 286 of removable member 280 and floor 256 of cavity 244 ensure good heat transfer between the parts of head 210. The connection between removable member 280 and cavity 244 can be made using any removable connection such as, but not limited to, threads, a snap fit connection, pin connector, or similar connection that provides a similar functionality.

Removable member 280 can be made from the same materials as the other parts of device body 202 as described above with respect to device body 102. In one embodiment, removable member 280 is made from the same material as device body 202. However, in an alternative embodiment, removable member 280 may comprise a metal or other thermally conductive material that has higher thermal conductivity compared to the other parts of device body 202.

The electrical connection between wires 234 and LED package 252 may be accomplished by providing a pair of spring loaded contacts 290a and 290b. Removable member 280 includes corresponding electrical contacts 292a and 292b that compress spring loaded contacts 290a and 290b as removable member 280 is screwed down. Any electrical coupling means can be used so long as electrical contact can be made with removable member 280 securely seated in cavity 244.

The use of a removable member 280 allows LED package 252 to be relatively easily replaced or upgraded. To replace or upgrade the LED package 252 with a repaired or improved LED package, the removable member 280 can be removed and a new removable member 280 including a new LED package 252 can be screwed into or coupled onto head 210. Dental practitioners can thereby avoid the expense of returning the entire device to a manufacturer (as in the case of a broken device) or discarding the entire device when a newer device is desired. Removable member 280 can be used in combination with any of the features described above with regard to any of the disclosed curing lights.

FIG. 13 also illustrates a reflective collar 294 that defines an opening having an interior surface 295. Reflective collar 294 reflects and channels light from LED package 252 to lens 250. In a preferred embodiment, reflective collar 294 has a cylindrical shape; however, if desired, other shapes may be used. Reflective collar 294 may include a reflective coating on interior surface 296 that improves the reflectivity of light on the surface thereof, thereby reducing absorption. The reflective coating is preferably a high sheen noble metal coating. Rhodium and palladium are examples of suitable noble metals and rhodium is particularly preferred. Noble metals are preferred for their ability to resist tarnishing, which can reduce reflectivity over time.

In one embodiment, the components of removable member 280 can be secured using a snap fit 298 created between a portion of lens housing 300 and threaded body 282. Reflective collar 294 can be secured within removable member 280 by wave spring 302 that abuts first washer 304, which also abuts lens housing 300. A second washer 306 separates reflective collar 294 from the bottom of removable member 280. The reflective collar 294 can be secured using a different type of spring, or with a different type of connection mechanism, such as, but not limited to, an adhesive.

In one embodiment, lens 250 has an antireflective coating on the surface thereof. The anti-reflective coating is preferably on the surface facing the LED dies; however, other surfaces can also be coated. The anti-reflective coating reduces reflection of the light off the surface of the lens, thereby increasing the percentage of light that passes through lens 250 and reduces absorption caused by light reflected off lens 250. Examples of anti-reflective coatings include, but are not limited to, magnesium fluoride. Of course, one or more collimating photonic crystals may be used as an alternative to lens 250.

The foregoing structures and coatings shown with respect to the embodiment of FIG. 13 can be used in combination with the features described in FIGS. 1-10 above.

In another alternative embodiment of the invention, the dental curing light includes a rechargeable battery, such as the rechargeable battery 139 shown in FIG. 4, in the cavity of the handle portion of the device body. In this embodiment, an electrical plug or other connection, such as an electrical plug or connection 141, at the proximal end of the handle portion replaces the power cord and allows the dental curing light to be connected to a charging station or base for recharging the battery. Underpowering the LED package as described above is particularly advantageous when used in combination with a rechargeable battery to allow higher power output for a longer period of time without recharging and/or to reduce the size of the battery pack while achieving desired periods of use between recharging.

III. Operating Configurations of Dental Curing Lights and Methods of Use

The dental curing lights of the present invention can be configured to emit at very high light output and/or to emit continuously at low operating temperatures and high efficiencies. In one embodiment, the curing light device includes an electronics assembly that controls power to the LED package. The electronics assembly can be configured to drive the LED die at very high light intensities for extended periods of time without overheating the LED die.

In one embodiment, the LED package can produce stable emission of total light output of at least about 2000 mW/cm$^2$, at least 3000 mW/cm$^2$, or even greater than 3500 mW/cm$^2$. For purposes of the present invention, unless otherwise indicated, total light output is measured using a thermopile measurement device. Other types of light measuring devices that can be used in some embodiments include spectrometers and Demetron Radiometers.

The LED curing devices of the present invention can achieve stable light output with an LED that is as intense as or even more intense than light generated by an arc lamp, which typically operates at 3500 mW/cm$^2$. The ability to emit light at such high light outputs using an LED light source is due in part to the use of the device body as a heat dissipater and the use of the thermally conductive layer to quickly and efficiently conduct the head away from the LED dies to the device body, where the heat is dissipated.

In one embodiment of the invention, the electronics assembly is configured to minimize wavelength shifting of the output of the LED dies, even at high intensity output. In this embodiment, the electronics assembly is configured to power the LED dies at a maximum input power that is substantially below the actual maximum or rated power of the LED dies. For example, the curing light can include one or more LED dies that are rated for operation at about 10 watts and the electronics assembly can be configured to power the device at a maximum input power of about 2.5 Watts.

In one embodiment, the electronics assembly is configured to power the LED package at a maximum input power of less than 80% of the rated maximum power of the LED dies, more preferably less than about 50%, even more preferably less than about 40%, and most preferably less than about 30% of rated maximum power, while achieving a light output of at least about 500 mW/cm$^2$, more preferably at least about 800 mW/cm$^2$, more preferably at least about 1000 mW/cm$^2$, even more preferably at least about 2000 mW/cm$^2$, or even at least about 3000 mW/cm$^2$.

In one embodiment, the LED curing light can be configured to have a very high efficiency of total light output per watt of power input, even at high light output. The devices of the invention can be configured to have an efficiency of total light output that is significantly greater than the typical efficiencies in high powered curing lights previously known, which tend to have efficiencies of total light output per watt of input power in the 10%-30% range. In one embodiment, the efficiency of the LED dies of the curing light of the invention is at least about 40%, more preferably at least about 50%, even more preferably at least about 60% and most preferably at least about 70%, where the efficiency is measured according to the watts of total light output from the curing light per watt of input power to the LED dies. For example in one embodiment, a curing light having an LED package with 4 LED dies and a rated power of 10 watts is operated at 6 watts and outputs a total light intensity of 3500 mW/cm$^2$. The highest efficiencies of the dental curing light device may be achieved with configurations including a reflective collar between the LED and the lens or photonic crystal. The use of an anti-reflective coating on any employed lens further improves efficiency.

Driving the LED dies at a fraction of their rated maximum power minimizes temperature cycling of the LED dies and nearby structure. This technique is particularly advantageous for use with LED configurations that include two or more LED dies. Driving a first LED die below its rated power ensures that the adjacent LED die emits at its design wavelength at a desired power output. Thus, a plurality of LED dies can be simultaneously operated at one or more desired wavelengths continuously for an extended period of time without causing detrimental wavelength shift or significant power drop in any of the LED dies as a result of overheating.

Underdriving the LED package results in reduced operating temperatures near the LED die. In one embodiment, the temperature in the LED package adjacent the dies can be kept below about 80° C., more preferably below about 70° C., and most preferably below about 50° C., which is much cooler than the typical maximum operating temperatures (e.g., more than 125° C.) of traditional curing light systems. The cool running curing lights of the invention can be inserted into the mouth of the dental patient without fear of burning the patient or causing discomfort. Although some embodiments of the invention include underdriven LED dies, in other embodiments it may be desirable to overdrive the LED to produce a shift in wavelength.

In one embodiment of the invention, the power input and light output of the dental curing light 100 can be ramped over a period of time. The low operating temperature and/or high light output of the curing lights of the present invention provides for many possible ramp times and light output intensities. A ramp time may be appropriate for one scenario but not for another. In one embodiment, the dental curing light may include circuitry configured to allow the user to choose a ramp time for ramping up the light output of the dental curing device. In one embodiment, an electronics assembly of the dental curing device includes a plurality of selectable ramp times within a range from about 2-20 seconds, more preferably 5-15 seconds. Exemplary selectable times include 5 seconds, 10 seconds, 15 seconds, and 20 seconds. In this embodiment, the user selects one of the plurality of ramp times and the device incrementally increases power input to reach the selected light output intensity in the selected period of time. For example, if the selected light intensity output is 2000 mW/cm$^2$ and the user selected ramp time is 5 seconds, the electronics assembly incrementally increases power input to the LED die to reach a light intensity output of 2000 mW/cm$^2$ within 5 seconds. Using the same device, the user can select a different ramp time, such as 3 seconds, and the electronics assembly will incrementally increase input power to the desired light intensity output (e.g., 2000 mW/cm$^2$) within 3 seconds. Additional details regarding ramping are described in U.S. Patent Publication No. 2006/0033052 to Scott, which is hereby incorporated herein by reference.

The present invention also includes methods of curing a polymerizable composition using a dental curing light. The method includes (i) providing a dental curing light according to one or more of the foregoing embodiments, (ii) depositing a light curable composition within the oral cavity of a patient, and (iii) curing the composition using the dental curing light by directing a beam of light toward the polymerizable composition for a sufficient amount of time to cure the light curable composition, the beam of light having a light intensity of at least about 2000 mW/cm$^2$. The dental composition includes a polymerizable component and a photo initiator that is sensitive to light at the wavelength emitted from the light curing device. Examples of light curable dental compositions are disclosed in U.S. Patent Publication No. 2006/0194172 to Loveridge, which is hereby incorporated herein by reference. Those skilled in the art are familiar with wavelengths and compositions for placing and curing a curable composition in the tooth of a patient.

It will be appreciated that the present claimed invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A dental curing light comprising:
 a unitary, one-piece body including a first end and an opposite second end, the unitary, one-piece body being constructed from a single piece of a thermally conductive material, the unitary, one-piece body comprising:
  a head disposed at the first end of the unitary, one-piece body, the head including a head cavity;
  a handle including the second end of the unitary, one-piece body, the handle having a length sufficient for a user to hold and manipulate the curing light with one hand;
  a neck disposed between the head and the handle;
  an internal cavity disposed in the handle of the unitary, one-piece body, the internal cavity disposed between the first end and the second end of the unitary, one-piece body; and
  an electrical plug or connection disposed at the second end of the unitary, one-piece body, electrical plug or connection located at a terminal end of the unitary, one-piece body;
 one or more light emitting diodes disposed in the head cavity of the head;
 an electronics assembly disposed within the internal cavity, the electronics assembly configured to drive the one or more light emitting diodes; and
 one or more batteries disposed within the internal cavity, the one or more batteries being entirely disposed between the first end and the second end of the unitary, one-piece handle;
 wherein the single piece of the thermally conductive material of the unitary, one-piece body provides heat dissipation from the first end to the second end of the unitary, one-piece body; and
 wherein the unitary, one-piece body does not include any joints that eon create resistance to thermal conduction.

2. The dental curing light of claim 1, wherein the one or more batteries are rechargeable; and
 wherein the electrical plug or connection allows the dental curing light to be connected to a charging station or base for recharging the one or more batteries.

3. The dental curing light of claim 1, further comprising a thermally conductive layer disposed between the one or more light emitting diodes and the thermally conductive material of the one-piece body, wherein the thermally conductive layer includes a first thermal conductivity that is greater than a second thermal conductivity of the thermally conductive material of the unitary, one-piece body.

4. The dental curing light of claim 3, wherein the thermally conductive layer comprises at least one of a thermally conductive grease, gel, or adhesive.

5. The dental curing light of claim 3, wherein the thermally conductive layer comprises at least one of aluminum nitride, beryllium oxide, diamond, silicon carbide, nanomaterials of carbon, boron nitride, thermally conductive ceramics, or thermally conductive particulate metals.

6. The dental curing light of claim 1, further comprising:
a first exterior surface of the head of the unitary, one-piece body, the head cavity being disposed in the first exterior surface; and
an opposite, second exterior surface of the head of the unitary, one-piece body, the second exterior surface being a substantially planar surface.

7. The dental curing light of claim 1, wherein an outer surface of the neck and the head of the unitary, one-piece body are substantially planar.

8. The dental curing light of claim 1, wherein:
the handle of the unitary, one-piece body includes a thickness in a range from 15 millimeters (mm) to 30 mm; and
the neck and the head have thicknesses in a range from 1 mm to 10 mm.

9. The dental curing light of claim 1, wherein the entire unitary, one-piece body serves as a heat conductor and dissipator because the unitary, one-piece body is a single piece of thermally conductive material; and
wherein the unibody construction of the unitary, one-piece body helps maximize heat dissipation without resistance to thermal conduction caused by joints or seams.

10. The dental curing light of claim 1, wherein:
the internal cavity has substantially flat longitudinal sidewalls extending to a substantially flat bottom surface;
portions of the unitary, one-piece body surrounding the longitudinal sidewalls and the bottom surface have a convex shape; and
the internal cavity includes one or more holes that allow the electronics assembly to be secured to the unitary, one-piece body.

11. The dental curing light of claim 1, further comprising an opening in the second end of the unitary, one-piece body that extends into the internal cavity.

12. The dental curing light of claim 1, wherein the unitary, one-piece body is substantially straight without any turns or bends.

13. The dental curing light of claim 1, further comprising a lens disposed over the head cavity such that the lens does not extend past an outermost surface of the unitary, one-piece body.

14. The dental curing light of claim 1, wherein the entire unitary, one-piece body functions as a heat sink with substantially uniform thermal conduction because no seams or joints create resistance to thermal conduction.

15. The dental curing light of claim 1, further comprising a cup-like member sized and configured to be removably disposed within the head cavity of the head, wherein the cup-like member houses the one or more light emitting diodes.

16. The dental curing light of claim 1, wherein the unitary, one-piece body is a single piece of aluminum alloy.

17. A dental curing light, comprising:
a unitary, one-piece body formed of a single piece of thermally conductive material and having an elongated shape that extends between a first end and a second end, the unitary, one-piece body providing thermal conduction and heat dissipation throughout the body because the body is the single piece of material, the unitary, one-piece body comprising:
a head disposed at a first end of the unitary, one-piece body;
a handle disposed at an opposing second end of the unitary, one-piece body, the handle having a sufficient length for a user to hold and manipulate the curing light with one hand;
an internal cavity sized and configured to house a battery pack and an electronics assembly, the internal cavity disposed between the first end and the second end of the unitary, one-piece body;
a neck comprising a narrowed region extending between the head and the handle, the neck being configured for insertion into a mouth of a patient; and
a passageway at least partially disposed in the neck, the passageway disposed between the head and the internal cavity;
the electronics assembly disposed in the internal cavity;
the battery pack disposed in the internal cavity;
one or more light emitting diodes disposed on at least one region of the head;
wherein the unitary, one-piece body functions as a heat sink into which waste heat produced by operation of the one or more light emitting diodes is transferred;
wherein heat dissipation occurs throughout the unitary, one-piece body because the unitary, one-piece body is a single piece of thermally conductive material; and
wherein the unitary, one-piece body does not include any joints or seams that create resistance to thermal conduction.

18. The dental curing light of claim 17, wherein the internal cavity includes one or more holes, grooves, or mounting points that are configured to secure the electronics assembly to the unitary, one-piece body.

19. The dental curing light of claim 17, further comprising:
a lens that does not extend past an outermost surface of the unitary, one-piece body; and
a thermally conductive layer disposed between the one or more light emitting diodes and the thermally conductive material of the unitary, one-piece body, wherein the thermally conductive layer includes a first thermal conductivity that is greater than a second thermal conductivity of the unitary, one-piece body.

20. The dental curing light of claim 17, wherein the single piece of thermally conductive material that forms the neck, the handle, and the head has no seams or joints therein to allow more uniform heat dissipation throughout the unitary, one-piece body.

21. A dental curing light, comprising:
an elongated body having a unibody, single-piece construction and being formed of a single piece of thermally conductive material, the elongated body comprising:
a head at a first end having a head cavity disposed therein;
a handle at a second end opposite the first end;
an internal cavity disposed in the handle between the first end and the second end of the elongated body, the internal cavity including a rim defined in a longitudinal, external surface of the handle, and the internal cavity disposed along a length of the handle;
a neck disposed between the head and the handle;
a passageway extending between the head cavity and the internal cavity in the handle;

an end opening at the second end that provides a passageway between the internal cavity in the handle and an exterior of the elongated body; and one or more holes, grooves, or mounting points that are configured to secure an electronics assembly to the unitary, one-piece body;

the electronics assembly disposed in the internal cavity of the handle; and one or more light emitting diodes disposed on at least one region of the head;

wherein the elongated body functions as a heat sink to which a majority of waste heat produced by operation of the one or more light emitting diodes is transferred;

wherein the unitary, one-piece body functions as a heat sink that dissipates heat from the first end to the second end of the elongated body; and wherein the unitary, one-piece body does not include any joints or seams that ee create resistance to thermal conduction.

* * * * *